(12) United States Patent
Grove et al.

(10) Patent No.: US 10,229,577 B2
(45) Date of Patent: Mar. 12, 2019

(54) PROACTIVE POWER OUTAGE ALERTS MANAGEMENT SYSTEM AND METHODS

(71) Applicant: Florida Power and Light Company, Juno Beach, FL (US)

(72) Inventors: Jon Grove, Palm Beach Gardens, FL (US); Lakshmi Penmetsa, Wellington, FL (US); Andrew Kirby, Jupiter, FL (US); Kirk Suscella, Jupiter, FL (US); Eric Westover, Jupiter, FL (US); Vijin Vallelil, Riviera Beach, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 81 days.

(21) Appl. No.: 15/422,095

(22) Filed: Feb. 1, 2017

(65) Prior Publication Data

US 2018/0218584 A1    Aug. 2, 2018

(51) Int. Cl.
*H04Q 9/00* (2006.01)
*G08B 21/18* (2006.01)
(Continued)

(52) U.S. Cl.
CPC .............. *G08B 21/18* (2013.01); *H04L 43/10* (2013.01); *H04L 51/04* (2013.01); *H04L 67/306* (2013.01);
(Continued)

(58) Field of Classification Search
CPC ........ G08B 21/18; G08B 21/00; G01D 4/004; G06F 1/30
(Continued)

(56) References Cited

U.S. PATENT DOCUMENTS

| 8,588,991 B1 | 11/2013 | Forbes, Jr. |
| 8,751,848 B2 | 6/2014 | Colban et al. |

(Continued)

FOREIGN PATENT DOCUMENTS

| JP | 5670555 | 2/2015 |
| WO | 2012177038 | 12/2012 |

(Continued)

OTHER PUBLICATIONS

Duang, D., et al., "Smart Grid Ping—A Customized Ping Tool for a Heterogeneous and Hybrid Smart Grid Communication Network", International Journal of Advanced Computer Science and Information Technology (IJACSIT), 2013, pp. 67-75, vol. 2, No. 4.

(Continued)

*Primary Examiner* — Albert K Wong
(74) *Attorney, Agent, or Firm* — Jose Gutman; Fleit Gibbons Gutman Bongini & Bianco P.C.

(57) ABSTRACT

A system, an alternative system, and a computer readable storage medium, for a power outage notification system that proactively manages communication of power outage alerts messages to customers of a power distribution system. Wireless communications between smart meters at the edge of an electrical power distribution network and a proactive outage alerts processing engine at an outage alerts notification information processing system facilitate management of communications of power outage alerts messages to customer communication devices. Power outage alerts messages can be communicated to customers using email messaging, text messaging, and voice mail messaging.

20 Claims, 16 Drawing Sheets

(51) Int. Cl.
*H04L 12/58* (2006.01)
*H04L 12/26* (2006.01)
*H04L 29/08* (2006.01)

(52) U.S. Cl.
CPC .......... *H04Q 9/00* (2013.01); *H04M 2203/45* (2013.01); *H04Q 2209/10* (2013.01); *H04Q 2209/30* (2013.01); *H04Q 2209/40* (2013.01); *H04Q 2209/60* (2013.01)

(58) Field of Classification Search
USPC .......................................... 700/297; 702/58
See application file for complete search history.

(56) References Cited

U.S. PATENT DOCUMENTS

| | | | |
|---|---|---|---|
| 8,761,361 B2 | 6/2014 | Borras et al. | |
| 8,779,927 B2 | 7/2014 | Bell et al. | |
| 8,892,375 B2 | 11/2014 | Taft | |
| 9,072,003 B2 | 6/2015 | Kim et al. | |
| 9,207,698 B2 | 12/2015 | Forbes, Jr. | |
| 9,220,058 B1 | 12/2015 | Choong | |
| 9,230,429 B2 | 1/2016 | McKinley et al. | |
| 9,319,894 B2 | 4/2016 | Kim et al. | |
| 9,369,822 B2 | 6/2016 | Tarradell | |
| 9,513,648 B2 * | 12/2016 | Forbes, Jr. | G05B 19/02 |
| 2004/0061616 A1 * | 4/2004 | Fischer | G06F 1/30 340/657 |
| 2008/0183339 A1 * | 7/2008 | Vaswani | G01D 4/004 700/297 |
| 2016/0109495 A1 | 4/2016 | Sterkel | |
| 2016/0132397 A1 | 5/2016 | Hui et al. | |
| 2016/0141873 A1 | 5/2016 | Ellice-Flint et al. | |
| 2016/0147209 A1 | 5/2016 | Stoupis et al. | |
| 2016/0154040 A1 | 6/2016 | Driscoll et al. | |
| 2016/0198245 A1 | 7/2016 | Rhoads et al. | |
| 2016/0291076 A1 | 10/2016 | Rieken | |
| 2016/0342169 A1 | 11/2016 | Imes et al. | |
| 2016/0345080 A1 | 11/2016 | Saikusa | |

FOREIGN PATENT DOCUMENTS

| | | |
|---|---|---|
| WO | 2014089958 | 6/2014 |
| WO | 2014173117 | 10/2014 |
| WO | 2015133941 | 9/2015 |
| WO | 2015183517 | 12/2015 |
| WO | 2016046353 | 3/2016 |
| WO | 2016118979 | 7/2016 |

OTHER PUBLICATIONS

Liu, T., et al., "Abnormal traffic-indexed state estimation: A cyber-physical fusion approach for Smart Grid attack detection", Future Generation Computer Systems, http://dx.doi.org/10.1016/j.future.2014.10.002, Copyright 2014, pp. 1-10.

Swetha, R., et al., "Smart Grid—A Network based Intrusion Detection System", Proceedings of the International Conference on Innovations in Computing Techniques (ICICT 2015), Jan. 22-24, 2015, pp. 1-8.

* cited by examiner

| HEADER | STATUS | TIME STAMP | TICKET DB TYPE |
|--------|--------|------------|----------------|
| 1 | NEW | | FEEDER |
| 2 | ARRIVE | | LATERAL |
| 3 | REFER | | TRANSFORMER |
| 4 | RESTORE | | LATERAL |
| ⋮ | ⋮ | ⋮ | ⋮ |

FIG. 4

PROACTIVE POWER OUTAGE ALERTS MANAGEMENT SYSTEM AND METHODS

FIELD OF THE DISCLOSURE

The present disclosure generally relates to power outage notification systems, and more particularly to a power outage notification system that proactively manages power outage alerts messages for a wide area power distribution system serving large numbers of customers.

BACKGROUND

Current power utility company customers have been increasingly demanding to be notified using their preferred mode of communication (e.g., email message, text message, automatic phone call message, etc.) when power is lost and when power is restored to the customer's location (also referred to as customer premises). In conventional power outage notification systems, many customers have received wrong notifications or do not receive notifications on a timely basis (i.e., as soon as power conditions change). Often, customers have received over notifications of the wrong power conditions at their customer premises. That is, for example, a customer that has had power restored to their customer premises may continue to repeatedly receive power outage notification messages for many hours. This frustrates customers and can detrimentally affect the customer satisfaction associated with a power utility company in an increasingly competitive environment. These erroneous, uncoordinated, untimely, and over notifications to customers have been in part caused because power line conditions at specific customer locations (also referred to as customer premises) in a power distribution network have not been reliably determinable in current power distribution networks.

Recently smart power usage meters (Smart Meters) have been installed in many customer premises. These Smart Meters can communicate via a wireless network with a central monitoring station. However, the wireless communication network is very limited in bandwidth and messaging throughput. On occasion, communications from Smart Meters over a grid powered wireless mesh network fail to be received by the central monitoring station. Therefore, not all Smart Meters in a commercial power distribution network (especially in a wide area power distribution system serving large numbers of customers) can be monitored contemporaneously in real time by a central monitoring station. The central monitoring station has to operate with a level of uncertainty regarding which specific customer locations are currently experiencing power outage conditions and which specific customer locations have not lost power or have their power restored following a power outage. The central monitoring station often does not have all relevant information to reliably determine whether power is down or power is up at specific customer locations. Customers suffer from not having the correct notices on a timely basis as demanded, and often receive repeated wrong notifications (over notifications).

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 4 is a data block diagram illustrating an example of a ticket database including ticket records used by the example power outage management system shown in FIG. 1;

DETAILED DESCRIPTION

Figure 1:
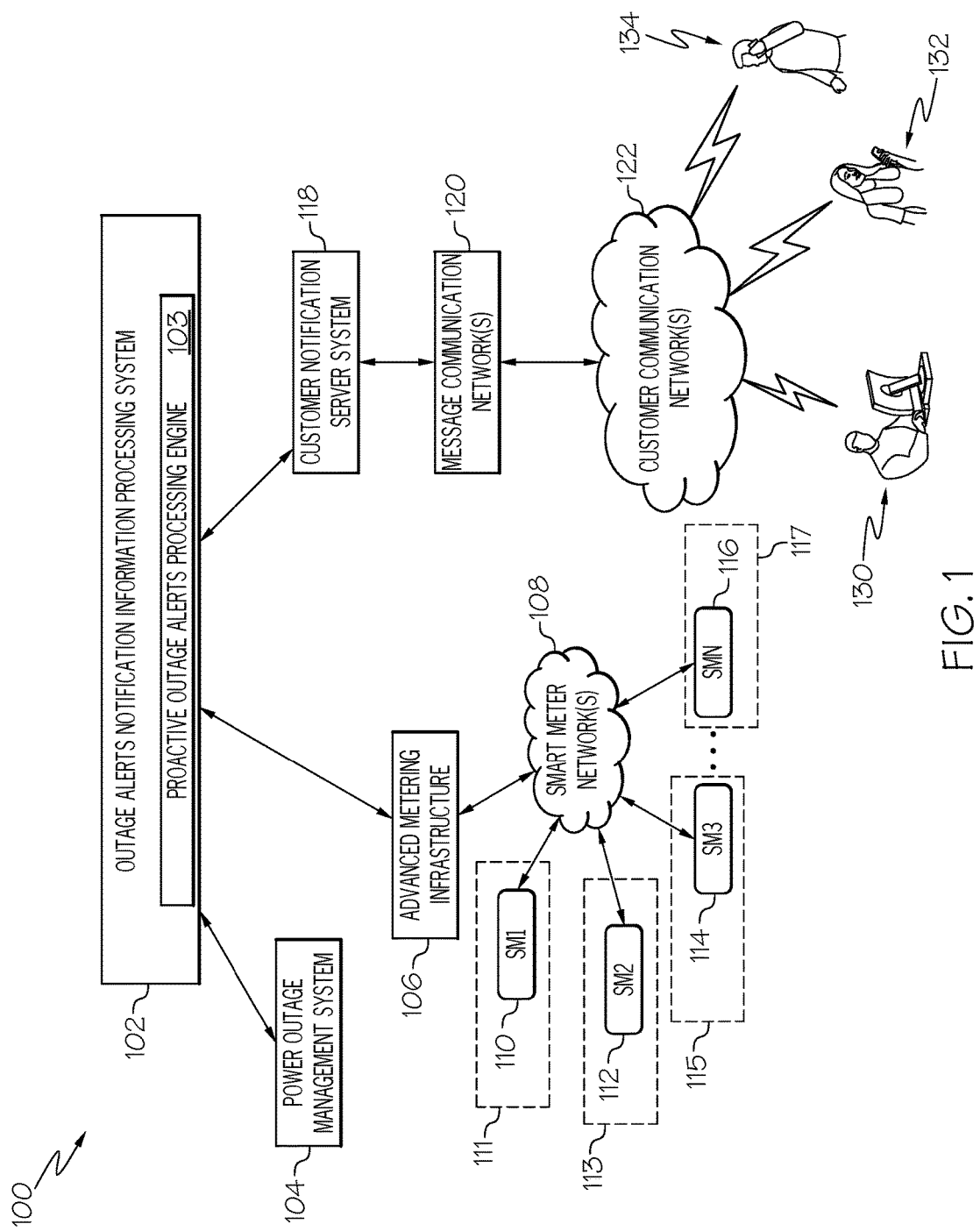
FIG. 1 is a block diagram of a proactive outage alerts notification system, according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one of ordinary skill in the art to variously employ the present subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. Upper or lower case use of terms throughout the specification and claims have the same meaning, for example, "Smart Meter" and "smart meter" have the same meaning, and "Ticket" and "ticket" have the same meaning.

Overview of a New Power Outage Alerts Notification System and Method

According to an example of a proactive power outage alerts notification system, a central power outage monitoring system analyzes certain wireless messages selectively received from one or more smart power usage meters (also referred to as smart meters or as Smart Meters) located at respective customer locations (also referred to as customer premises) at the edge of the electrical power distribution grid or network (also referred to as the Power Network) to determine power conditions in the Power Network, including determining power conditions at customer locations other than the respective customer locations. That is, the central power outage monitoring system selectively receives and analyzes certain wireless messages from one or a few Smart Meters at customer locations sharing a commonly connected power line section in the Power Network.

A power line section is intended to mean any of: 1) a power line conductor that can distribute electrical power between two switches that each can be opened or closed; 2) a power line conductor between a switch that can be opened or closed and an end of a power line (e.g., an edge of an electrical power distribution network); or 3) a power line conductor between a switch that can be opened or closed and a source of power into a power line (e.g., a power substation, a power generator, or other electrical power source into a power distribution network). Each line section can be considered independent from another line section in the power distribution network. A switch can be used to interconnect a power line section to another power line section to change the paths (topology) of distribution of electrical power in a power distribution network. A transformer is normally not a switched device with a switch that can be opened or closed. A transformer typically transfers power passively without a controllable switch that can be opened or closed.

With information selectively received from the few Smart Meters, the central monitoring system can reliably determine power ON or OFF conditions at line sections that include at least one Smart Meter. Power conditions (e.g., ON/OFF) can be determined at more customer locations than the customer locations from which were received the Smart Meter wireless messages, as will be discussed in more detail below.

According to the example system, Smart Meters wirelessly selectively send (transmit) outage signals which, according to various embodiments, may also be referred to as meter status messages to the central monitoring station (the Monitor) to report power line outage conditions status (e.g., power OFF, power ON, or power restored from OFF to ON) at the edge of the Power Network via an Advanced Metering Infrastructure (AMI).

The meter status messages are selectively received by the Monitor from each of the Smart Meters over a wireless communication network (also referred to as a smart meter network or a Communication Network). The meter status messages are transmitted by at least one of the Smart Meters when a change of status of power line outage conditions is detected by the Smart Meter. The Communication Network has limited bandwidth and messaging throughput.

The Monitor receives these messages and tracks them in an outage notice database along with Power Network fail/repair/restore status repair ticket records (also referred to as Tickets) for customers in the Power Network. The Tickets indicate the changing status of power line section outage conditions in the Power Network and may be considered to include an outage signal associated with an element of the electrical power distribution grid. The Tickets also indicate a repair status for the particular power line section connected to and shared by the particular Smart Meters on the particular power line section. The Tickets can be created as records in the Tickets database in a number of different ways. For example, a customer may call in a trouble condition experienced at a particular customer premises connected to a particular power line section in the electrical power distribution grid. As a second example, service personnel may communicate to a power outage management facility a detected condition at a particular point in a particular power line section in the electrical power distribution grid. As a third example, power sensing equipment connected to a particular point in a power line section in the electrical power distribution grid may monitor/detect power outage conditions at the particular point. The power sensing equipment may automatically send a power outage status reporting message (also may be referred to as an outage signal or an outage notification signal) to the power outage management facility. A smart meter located at a customer premises is an example of such a power sensing equipment that could automatically send an outage signal.

The Monitor additionally can selectively send an initial signal or ping message over the Communication Network to one of the Smart Meters which then responds by selectively sending a response signal or a ping response status message that reports the power line outage conditions (e.g., power OFF, power ON, or power restored from OFF to ON) at the Smart Meter at the time the ping message was selectively received. On occasion no ping response status message is received in response to the ping message selectively sent by the Monitor.

The Monitor uses a smart decision algorithm that combines information from Tickets, received meter status messages, received ping response status messages, and known network topology and equipment in the Power Network (e.g., which set of Smart Meters are on the same power distribution line section), to make a reliable determination of when power is OFF, ON, and when power has been restored from OFF to ON, at particular Smart Meters in the same power distribution line section in the Power Network.

This determination for Smart Meters sharing the same power distribution line section can be reliably made even while not all Smart Meters have provided to the Monitor their meter status messages or their ping response status messages. The reliable determination by the Monitor can be done while selectively sending only very few ping messages and selectively receiving very few ping response status messages from only a few Smart Meters on the same power distribution line section. This is important because the Communication Network has very limited bandwidth and messaging throughput. That is, if many messages are sent over the Communication Network between the Smart Meters and the Monitor it will create a bottleneck in the reporting infrastructure. In bottleneck conditions messages from Smart Meters will be lost or will not be timely received by the Monitor.

The ability for the Monitor to selectively transmit (send) and selectively receive wireless messages and reliably determine the power line conditions for particular Smart Meters, provides a means for more accurately and reliably notifying customers regarding the current power conditions at the customers' locations. Aspects of this new and novel power outage notification communication system and related methods will be more fully discussed below.

Example of a Power Outage Alerts Notification System

To address the various shortcomings of conventional power outage notification communication systems, a new and novel system and method for a proactive outage alerts notification system will be discussed in more detail below.

FIG. 1 illustrates an example of a proactive outage alerts notification system 100.

An outage alerts notification information processing system 102 includes a proactive outage alerts processing engine 103. The outage alerts notification information processing system 102 is communicatively coupled with a power outage management system 104.

The information processing system 102 is communicatively coupled with an advanced metering infrastructure 106. The advanced metering infrastructure 106 is communicatively coupled with one or more smart meter networks 108. The smart meter networks 108 include one or more smart meters 110, 112, 114, 116, located at respective customer premises 111, 113, 115, 117. According to the example, customer 130 is associated with premises 111 and Smart Meter 110, and is using a desktop PC and can receive over the customer communication network(s) 122 power outage notification messages using email message communications (email messaging). Customer 132 is associated with premises 113 and Smart Meter 112, and is using her mobile phone and can receive over the customer communication network(s) 122 power outage notification messages using text message communications (text messaging) or email message communications (email messaging). Customer 134 is associated with premises 115 and Smart Meter 114, and is using his mobile phone and can receive over the customer communication network(s) 122 power outage notification messages using voice mail message communications (voice mail messaging). See FIG. 6 for examples of these types of message communications.

Figure 5:
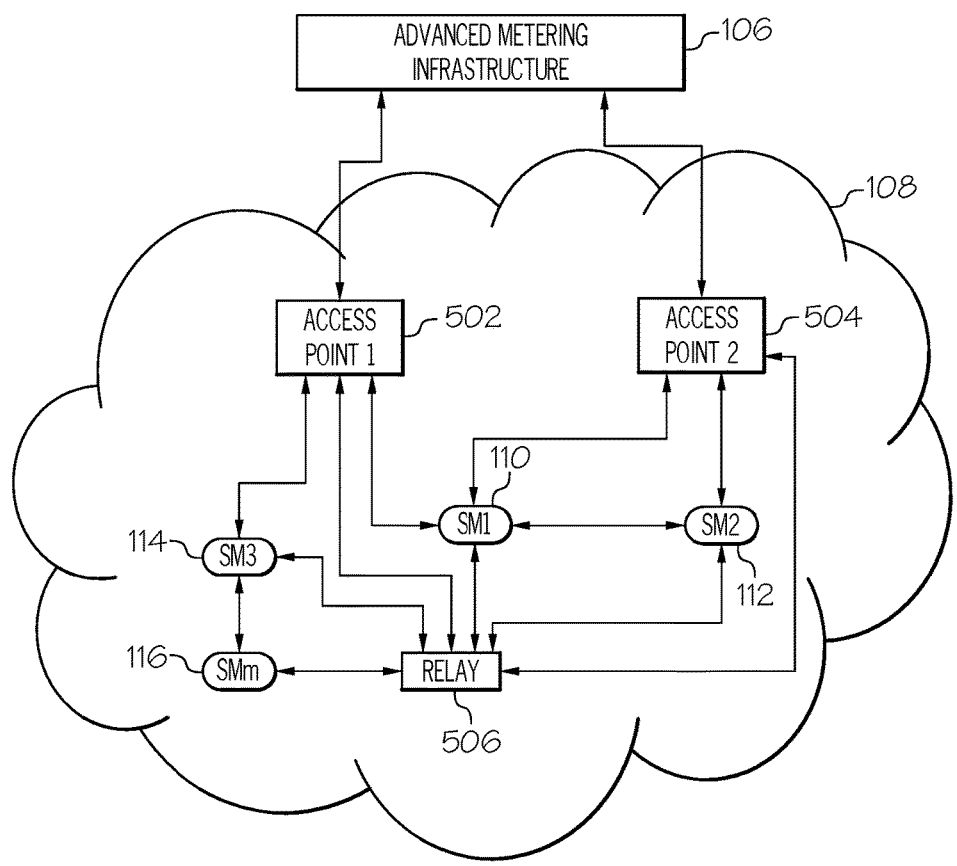
FIG. 5 is a block diagram of a more detailed view of the example Advanced Metering Infrastructure and the example smart meter network(s) shown in FIG. 1.

FIG. 5 illustrates a more detailed view of the advanced metering infrastructure 106 and the smart meter networks 108. The advanced metering infrastructure 106, according to the present example, comprises one or more communication servers and one or more communication networks that communicatively couple messages between the Smart Meter networks 108 and one or more information processing systems used by a power utility service organization. The outage alerts notification information processing system 102 is one of those information processing systems. The Smart Meter networks 108, in the present example, include two access points 502, 504, that are communicatively coupled with a mesh communication network of Smart Meters 110, 112, 114, 116. Additionally, one or more relay stations 506 can be included in the mesh communication network 108 and be communicatively coupled with one or more of the access points 502, 504. The one or more relay stations 506 can assist with relaying messages between the one or more of the access points 502, 504, and one or more of the Smart Meters 110, 112, 114, 116. It should be noted that each Smart Meter can operate like a relay station to pass along a received message from one communication device to another communication device. For example, Smart Meter one 110 can act as a relay station to relay a wireless communication message between Smart Meter two 112 and access point one 502.

The information processing system 102 is communicatively coupled with a customer notification server system 118. The customer notification server system 118 is communicatively coupled with a message communication infrastructure 120 that communicates with customer communication networks 122. The customer notification server system 118 receives and processes requests sent from the information processing system 102. Each request, according to one example, includes: 1) one or more power outage notification messages, 2) identification of at least one customer communication device for destination of the one or more power outage alerts messages in the request, and 3) identification of the communication channel to use for communicating the one or more power outage alerts messages in the request to at least one customer associated with the customer communication device. Therefore, the information processing system 102 sends, via the customer notification server system 118, the one or more power outage alerts notification messages destined for reception by the respective customer 130, 132, 134, using their associated at least one customer device 130, 132, 134, that operates in the customer communication network(s) 122. It should be understood that in this discussion, a particular customer 130, 132, 134, and their associated customer device 130, 132, 134, may be synonymously referred to as the customer or the customer device, as understood by the context of use.

There are many types of customer communication networks 122 and communication devices. This discussion is intended to broadly cover all such possible customer communication networks 122 and communication devices. For example, and not for any limitation, a mobile telephone may operate in a mobile telephone communication network. The mobile telephone can communicate messages using different communication channels. A voice message would be one example message that can be communicated to a customer using a voice communication channel. An email message would be a second example message that can be communicated to a customer using an email communication channel. A text message would be a third example that can be communicated to a customer using a text messaging communication channel.

The terms "destined for reception", "destined for selective reception", "selectively send", "selectively receive", and similar terms, as used herein with respect to a message that is sent, unless understood clearly different by the context used, is intended to broadly cover all forms of message addressing and message handling for targeting (selective) delivery of a message to a destination communication device. The message could be sent through one communication network and delivered through one or more additional communication networks as long as the message, by message addressing and/or by a specified message handling, is intended to eventually reach its targeted (selected) destination communication device.

Figure 2:
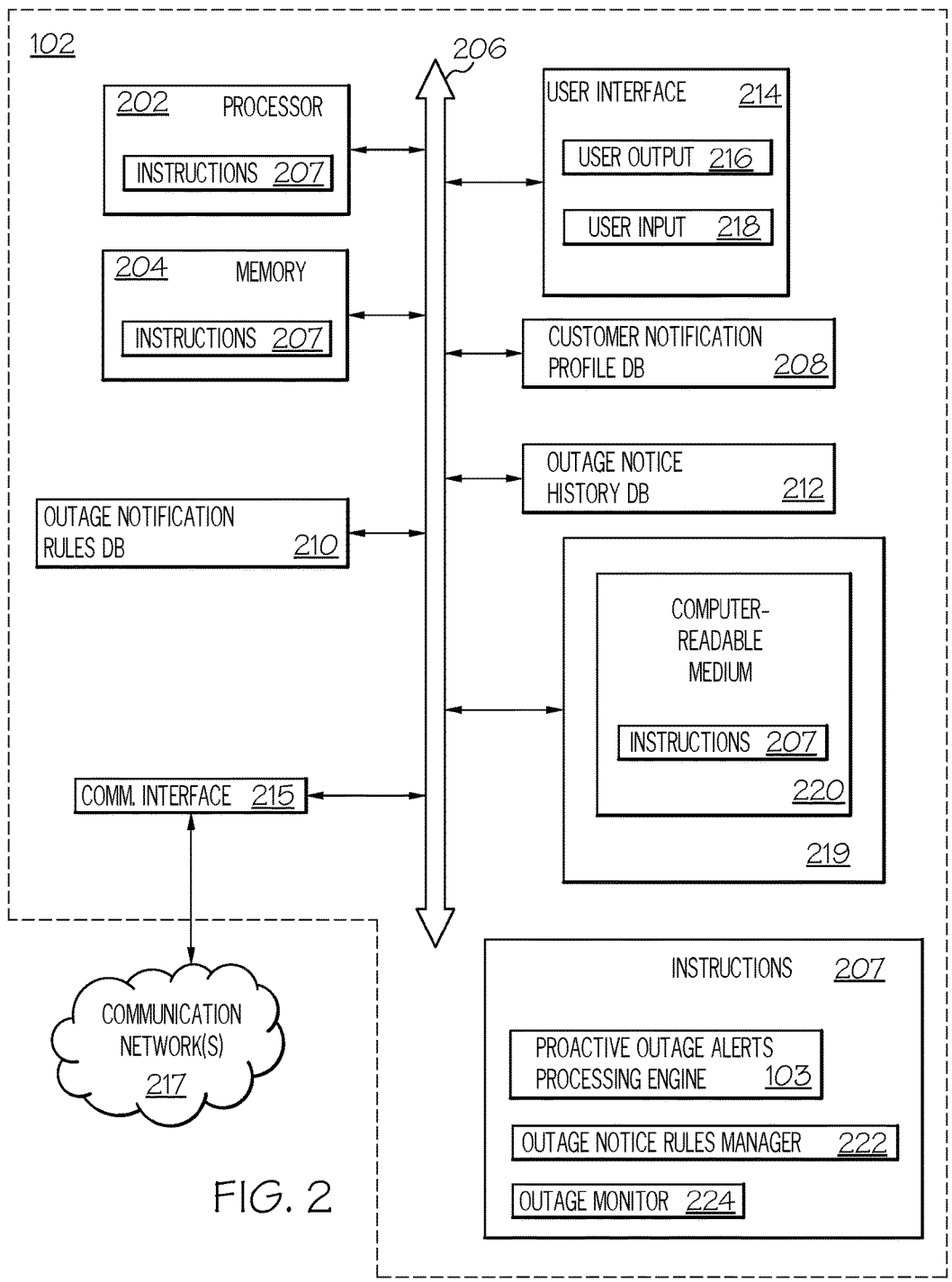
FIG. 2 is a block diagram of a more detailed view of the example outage alerts notification information processing system shown in FIG. 1.

Referring to FIG. 2, a more detailed view of the information processing system 102 is shown. At least one processor 202 is communicatively coupled with memory 204, which may include main memory, persistent memory, and storage memory. A bus architecture 206 facilitates communication between various components of the information processing system 102 as shown.

The processor 202 is communicatively coupled with an outage notification rules database 210. The outage notification rules database 210 stores one or more rules as records in the database. These rules are used by the proactive outage alerts processing engine 103 and the outage monitor 224 to determine outage conditions in one or more line sections in the power distribution network 300. These rules also are used to determine the particular power outage alert message(s) that the information processing system 102 should send to which customer(s) and when to send the particular power outage notification message(s).

Additionally, an outage notice history database 212 stores various history information that relates to: Tickets, throughout their lifecycle, time information for powerline section power outage events detected and power restore actions taken, notifications sent to customers, messages received from Smart Meters, and other information used by the proactive outage alerts processing engine 103 to keep track of power outage events in the power distribution network 300 and notifications sent to customers.

Figure 4:
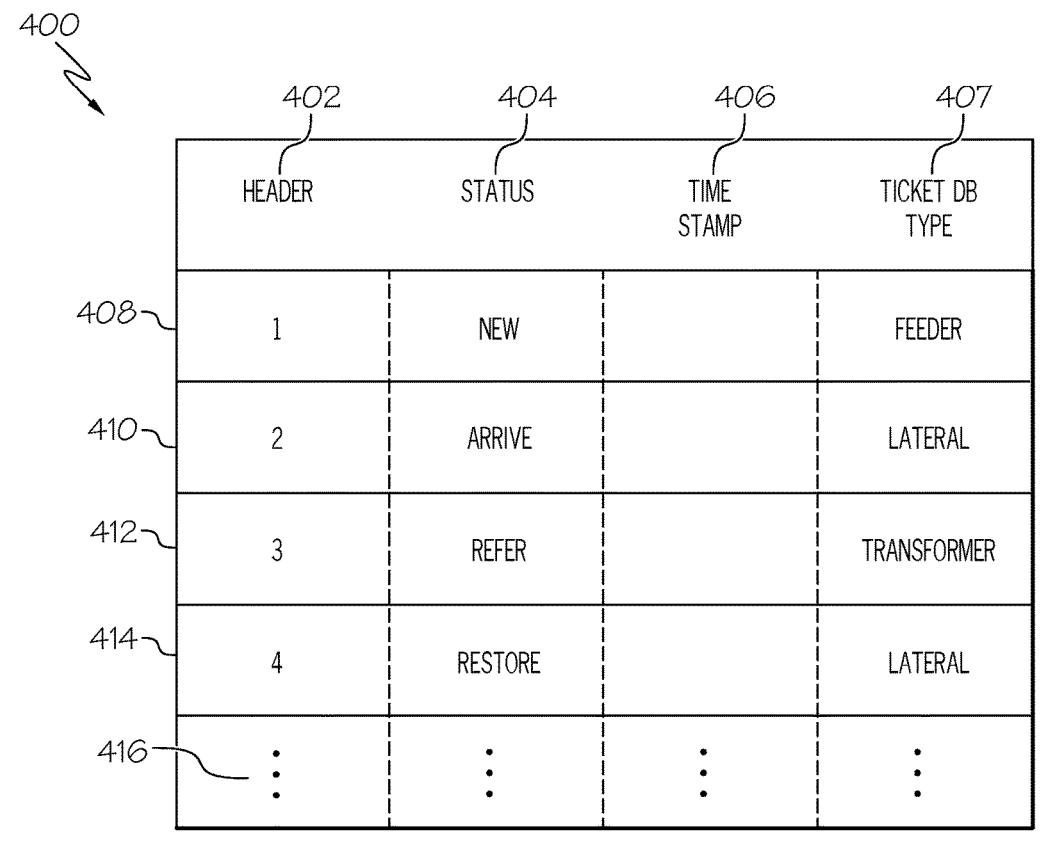

As illustrated in FIG. 4, a Tickets database 400 is communicatively coupled with the power outage management system 104. The Tickets database 400 is maintained by the power outage management system 104 to keep track of repair service tickets (Tickets) throughout their life cycle that are indicating power service outage conditions at particular one or more power line sections in the power distribution network 300. The information for a Ticket is stored in a Ticket record 408, 410, 412, 414, 416, in the Tickets database 400. The information in a Ticket record, according to the example, includes indication of the current status of a particular power service outage condition. The Tickets database 400 is communicatively coupled with the outage alerts notification information processing system 102. The information processing system 102 can look up Ticket records in the Tickets database 402 to collect information stored in the Ticket record(s) for the particular Ticket(s).

The Ticket records 408, 410, 412, 414, 416, in the Tickets database 400, according to the example, include fields of information that can be retrieved by the information processing system 102 doing a lookup in the Tickets database 400. A header field 402 contains Ticket identification information. For example, the header field 402 can contain a Ticket ID number, a description of the particular power outage condition associated with the Ticket, and other identifying information corresponding to the Ticket.

A status field 404 indicates the current status of a Ticket associated with the Ticket record. For example, the first Ticket record 408 has a status field 404 indicating it is a new Ticket and the power outage condition has been newly reported. This new Ticket is considered a New status. The second Ticket record 410 includes a status field 404 that indicates a service crew has arrived at the site of the power outage condition. This Ticket is considered an Arrive status. The third Ticket record 412 includes a status field 404 that indicates the problem has been referred to another service crew. This can occur for a number of reasons. However, typically this means that the problem has been escalated and that additional time will be needed to resolve the trouble with the power line section. The fourth Ticket record 414 includes a status field 404 that indicates that power has been restored to the particular one or more power line sections covered by the Ticket. This typically means that all customers affected should now have power restored to their customer premises. This Ticket is considered a Restore status. It also completes the lifecycle of a Ticket.

Each Ticket record 408, 410, 412, 414, 416, includes a Time Stamp field 406. This time stamp information indicates when the status of the Ticket most recently changed. Each Ticket record also includes a Type field 407. The Type field 407 indicates the type of Ticket associated with the Ticket record. According to the present example, there are three different types of Tickets. These three different types are: Feeder, Lateral, or Transformer.

A Feeder Ticket is associated with a power outage condition affecting one or more feeder lines 304. This power outage condition typically affects hundreds or even thousands of customer premises. This type of Ticket is considered a major power outage event for a neighborhood.

A Lateral Ticket is associated with a power outage condition affecting one or more lateral lines 312, 314. This power outage condition typically affects tens or even hundreds of customer premises.

A Transformer Ticket is associated with a power outage condition affecting one or more transformers 318, 320, 322, 324, 326, 328. Each affected transformer 318, 320, 322, is associated with an affected transformer line 330, 332, 334. This power outage condition typically affects from one to one hundred or more customer premises.

With reference again to FIG. 2, a customer notification profile database 208 stores profile records for each customer that 1) identify the particular customer, 2) indicate a notification channel preference requested by the customer, and 3) identify how each customer wants to be notified based on a selected notification channel preference.

Figure 6:
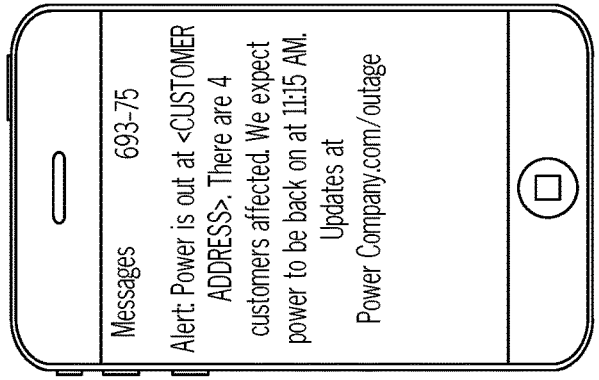
FIG. 6 is an illustration of three examples of power outage alerts message channels of communication that can be used by the proactive outage alerts notification system of FIG. 1.
Figure 7:
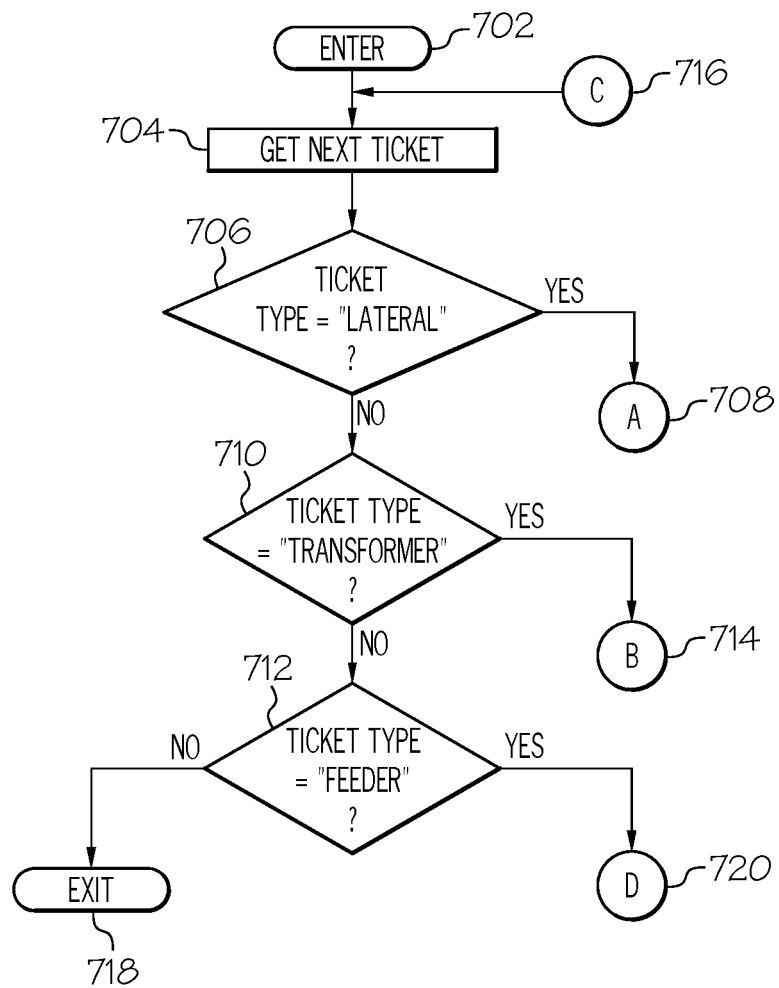
FIGS. 7 to 16 constitute a process flow diagram illustrating an example process for the proactive outage alerts notification system of FIG. 1.

According to the present example, with reference to FIG. 6, there are three different notification channels that can be selected by a customer for receiving communication of power outage notification messages from the customer notification server system 118. The communication channel can comprise at least one of: email messaging; text messaging; or voice messaging. In various implementations, the communication channel identified in a particular record stored in the customer notification profile database 208 for a customer is configured in the particular record by the customer entering user input into a user interface. For example, a customer can remotely access online a web user interface and portal for configuring parameters in the customer notification profile database 208 to customize use of the outage alerts notification information processing system 102 for the customer.

A first notification channel communicates power outage notification messages by email messaging 602. These email messages are typically visually read by a customer to actually receive the message.

A second notification channel communicates power outage notification messages by text messaging 604. These text messages are typically visually read by a customer to actually receive the message.

A third notification channel communicates power outage notification messages by voice mail messaging 606. These voice mail messages are typically audibly communicated to be heard by a customer to actually receive the message.

Referring again to the example shown in FIG. 2, a user interface 214 is communicatively coupled with the processor 202. The user interface 214 includes a user output interface 216 and a user input interface 218. The user interface 214 is communicatively coupled to the processor 202. The user output interface 216 can include one or more user output devices such as a graphic display, a speaker, visual display indicators, tactile alert devices, and the like. The user input interface 218 can include one or more user input devices such as a keyboard, switches, keypad, a touchscreen such as for a touchscreen display, a touchpad, a microphone to capture audio signals, and the like.

A communication interface module 215 include one or more communication devices that are communicatively coupled with the processor 202 to facilitate communications between the information processing system 102 and one or more communication networks 217. Each communication device may be used to communicate with a particular type of communication network 217.

A reader/writer device 219 is communicatively coupled with the processor 202. The reader/writer device 219 can read from or write to a computer readable medium 220. The computer readable medium 220 can store instructions 207, data, and configuration parameters, for use by the processor 202, and by operating system software and applications executing in the information processing system 102. Instructions 207 according to the present example include a proactive outage alerts processing engine 103, an outage notice rules manager 222, and an outage monitor 224, which will be more fully discussed below.

Figure 3:
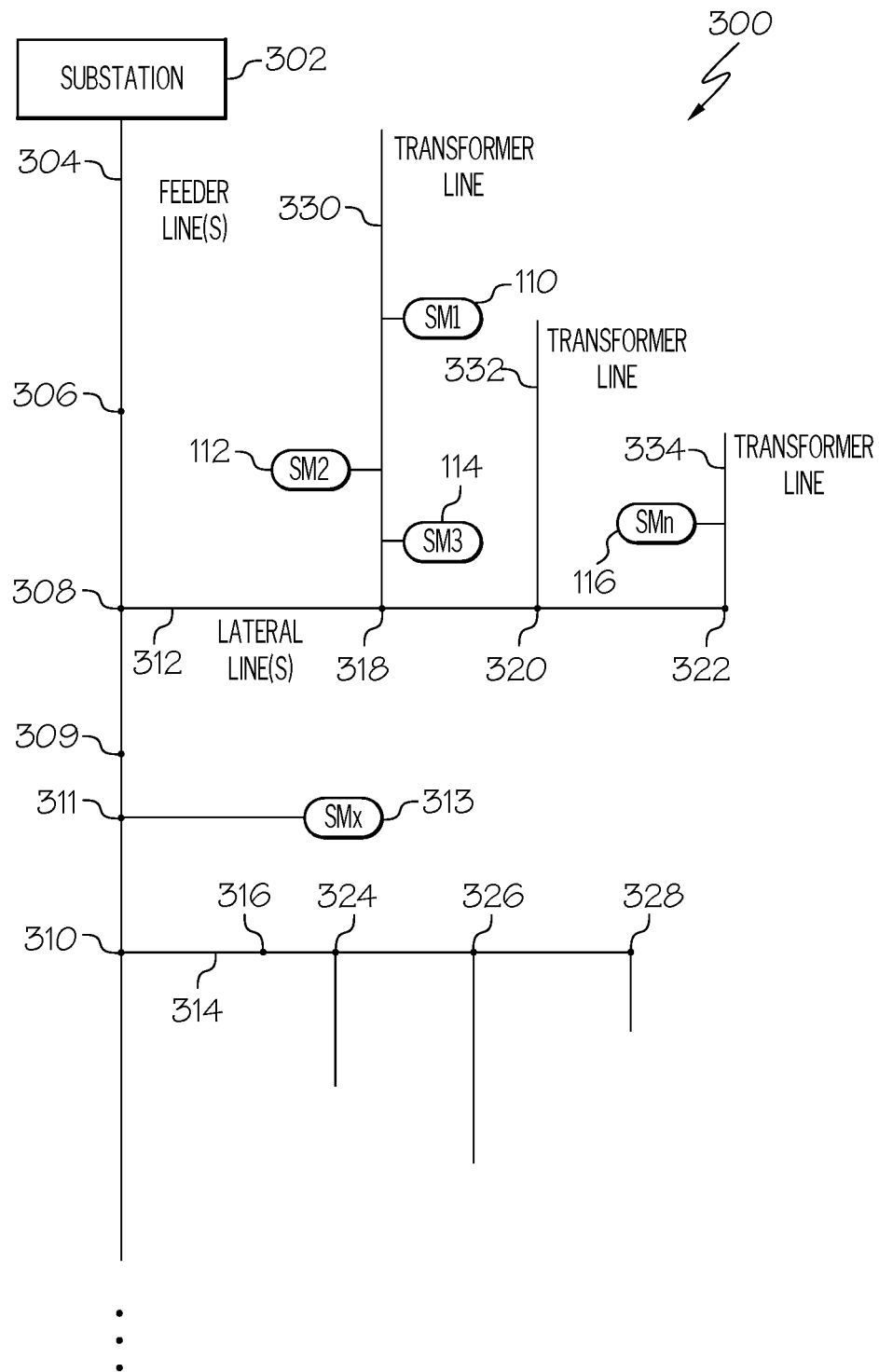
FIG. 3 is an illustration of an example power distribution system that can be compatible with the proactive outage alerts notification system of FIG. 1.

Referring to FIG. 3, an example of an electrical power distribution network 300 is shown. The power distribution network 300 includes several elements of the electrical power distribution grid including substations, feeder lines, lateral lines, transformers, switching equipment and smart meters. The substation 302 provides electrical power to a wide area such as a neighborhood of customer premises (customer locations).

The substation 302 distributes electrical power to one or more feeder lines 304, which are the main power lines distributing the electricity into the neighborhood. A feeder line 304 can have switching equipment 306 connected to the line 304 such that one of the feeder lines 304 can be manually or automatically connected with another one of the feeder lines 304 as may be necessary or desirable from time to time to reroute power distribution from the substation 302 into the portion of the neighborhood served by the feeder lines 304.

The one or more feeder lines 304, in this example, connect to controllable switching equipment 306, 309, that distributes electrical power to one or more lateral lines 312, 314, and directly from the feeder line 304 to one transformer 311 that distributes power to a Smart Meter 313, as shown. Lateral lines 312, 314, further distribute the electrical power to transformers 318, 320, 322, 324, 326, 328. The one or more lateral lines 312, 314, can include switching equipment 316. The switching equipment 306, 309, 316 can be manually or automatically operated to connect one of the lateral lines 312, 314 with another power line as may be necessary or desirable from time to time to reroute power distribution from the substation 302 into the portion of the neighborhood served by the one or more lateral lines 312, 314. Junctions 308 and 310 provide fused connections to transfer power from the main feeder line 304 to the lateral lines 312, 314. In the example shown in FIG. 3, a feeder line section can be defined between first switching equipment 306 and second switching equipment 309. This line section comprises the entire lateral line 312, including transformers 318, 320, and 322, transformer lines 330, 332, 334, and Smart Meters 110, 112, 114, 116.

The transformers 318, 320, 322, are connected to respective transformer lines 330, 332, 334. The other transformers 324, 326, 328 are also connected to respective transformer lines. A transformer line distributes power to one or more customer locations. These customer locations are considered the edge of the power distribution network 300. That is, the power is being distributed to these destinations (customer locations) at the edge of the network 300.

Several Smart Meters 110, 112, 114, 116, 313, each located at a particular customer location, transfer the electrical power from the connected transformer lines to the particular customer locations. While not every customer location is powered through a Smart Meter, a large growing percentage of customer locations use Smart Meters to deliver power to the customer locations. Unless understood clearly different by the context used, use of the term Smart Meter in this application is intended to also mean the associated customer location where the Smart Meter is operating to serve power to the customer location.

Additionally, it should be noted that Smart Meters can measure the level of power line signal at the Smart Meter. A Smart Meter can indicate that the power line at the Smart Meter is ON, when the power line signal is measured as being within a defined operational range for power line signals. For example, and not for limitation, a power line can have a normal operational range of 110 Volts to 120 Volts. A Smart Meter would indicate that the power line is ON if the measured signal at the Smart Meter is within this normal operational range.

On the other hand, a Smart Meter can indicate that a power line is OFF in various ways. One way is for a Smart Meter to send a Last Gasp (LG) message, just before all power is lost at the power line connected to the particular Smart Meter. This LG message is an indication that power has been lost at the power line section connected to the Smart Meter. A Smart Meter can be considered to indicate a power line OFF condition if the Smart Meter does not respond (within a determined time period, such as within several seconds) with a ping response message in response to a ping message. If a Smart Meter is powered by a backup power source (such as using a backup battery) the Smart Meter could send a ping response message that indicates the power line at the Smart Meter is OFF. In another example, a Smart Meter may measure that a level of power at the power line connected to the Smart Meter is below a normal operational range of 110 Volts to 120 Volts. A Smart Meter would indicate that the power line is OFF if the measured power signal at the Smart Meter is below this normal operational range. It is noted that the Smart Meter could operate from the power line even if the power level is below the normal power signal operational range of 110 Volts to 120 Volts.

FIGS. 7 to 16—Example Process Overview

FIGS. 7 to 16 make up a process flow diagram illustrating an example process for proactively processing outage notifications and sending associated power outage notification messages to destination communication devices of certain customers who have requested receipt of the power outage notification messages. The new and novel process is followed by the components of the example proactive outage alerts notification system 100 that have been discussed above.

The process is entered, at step 702, and immediately proceeds to get the next Ticket, at step 704. That is, the outage alerts notification information processing system 102 communicates with the power outage management system 104 and looks up a next Ticket in the Ticket database 400. As each new Ticket record is created in the Ticket database 400, and as each Ticket record in the Ticket database 400 is updated with new status and associated information, the particular Ticket record is prioritized in the Ticket database 400 such that the proactive outage alerts processing engine 103 operating in the information processing system 102 can do a lookup into the Ticket database 400 and retrieve the next Ticket to process.

Process for a Lateral Ticket

Figure 8:
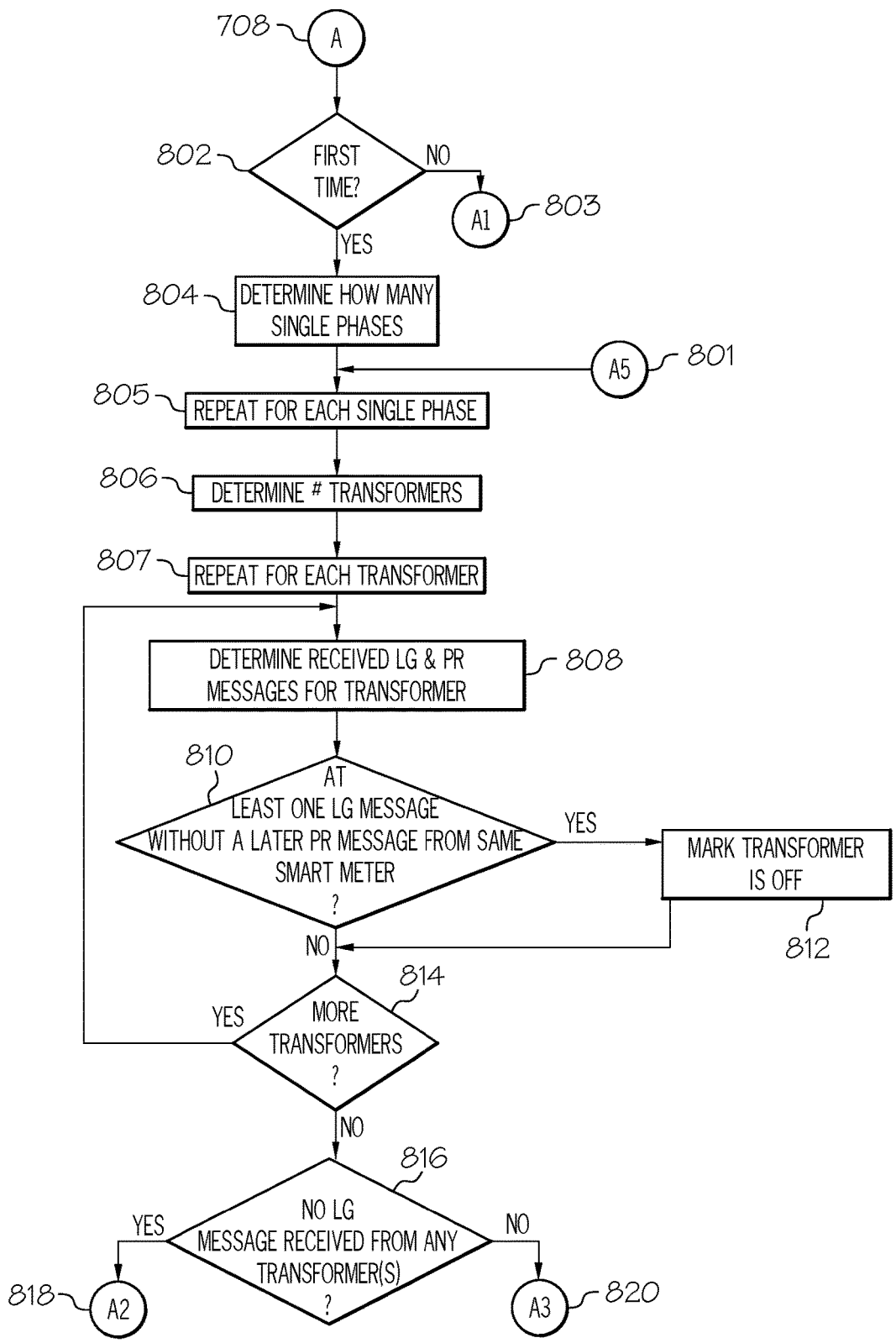

If the Type field 407 in the particular Ticket record 408, 410, 412, 414, 416, indicates that the Ticket is a Lateral type ticket, at step 706, then the process continues via the connector A 708 in FIG. 8. If the Ticket is not a Lateral type ticket, at step 706, then the proactive outage alerts processing engine 103 checks, at step 710, to see whether the Ticket type field 407 indicates it is a Transformer type ticket.

Figure 13:
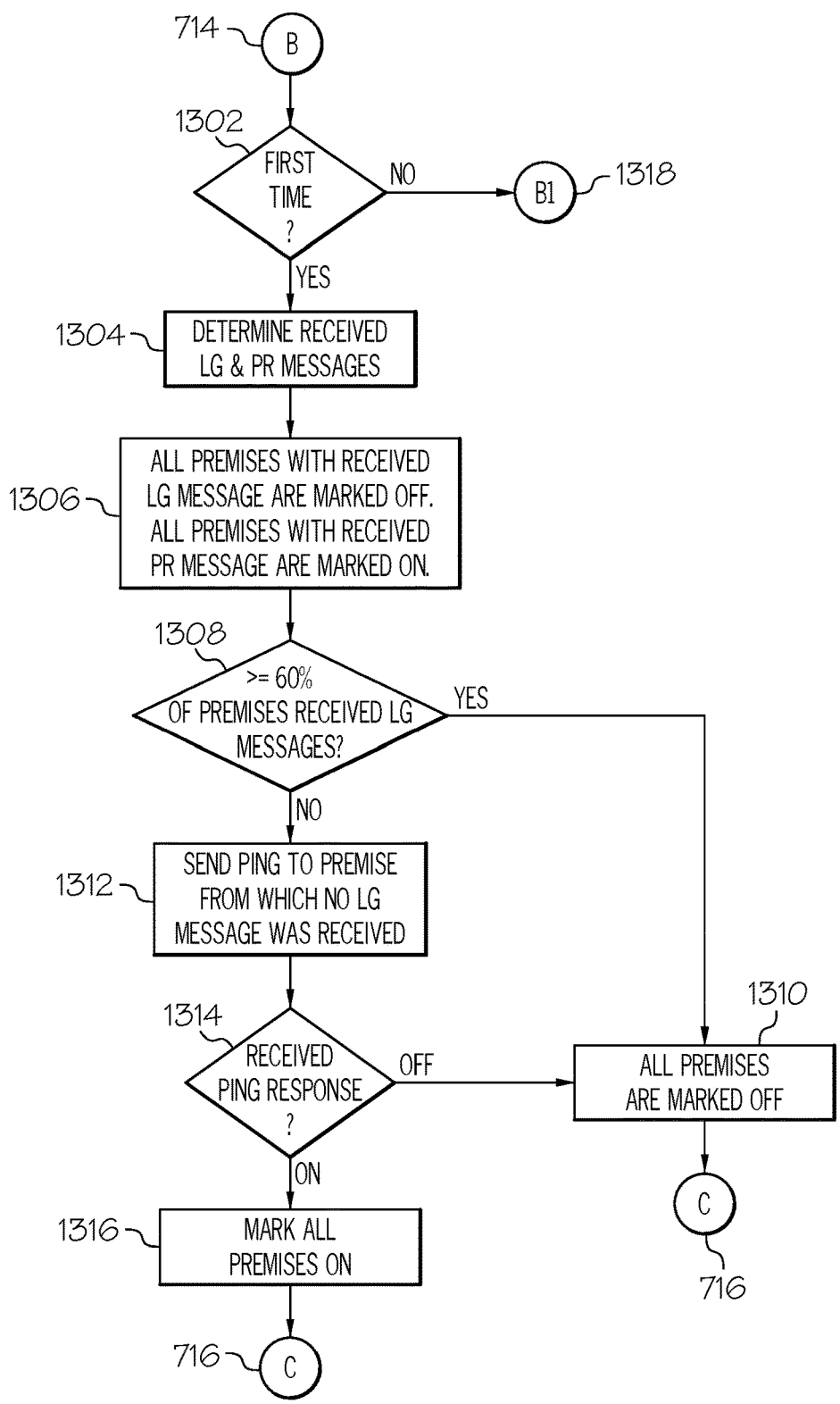

If the Type field 407 in the particular Ticket record 408, 410, 412, 414, 416, indicates that the Ticket is a Transformer type ticket, at step 710, then the process continues via the connector B 714 in FIG. 13. If the Ticket is not a Transformer type ticket, at step 710, then the proactive outage alerts processing engine 103 checks, at step 712, to see whether the Ticket type field 407 indicates it is a Feeder type ticket.

Figure 15:
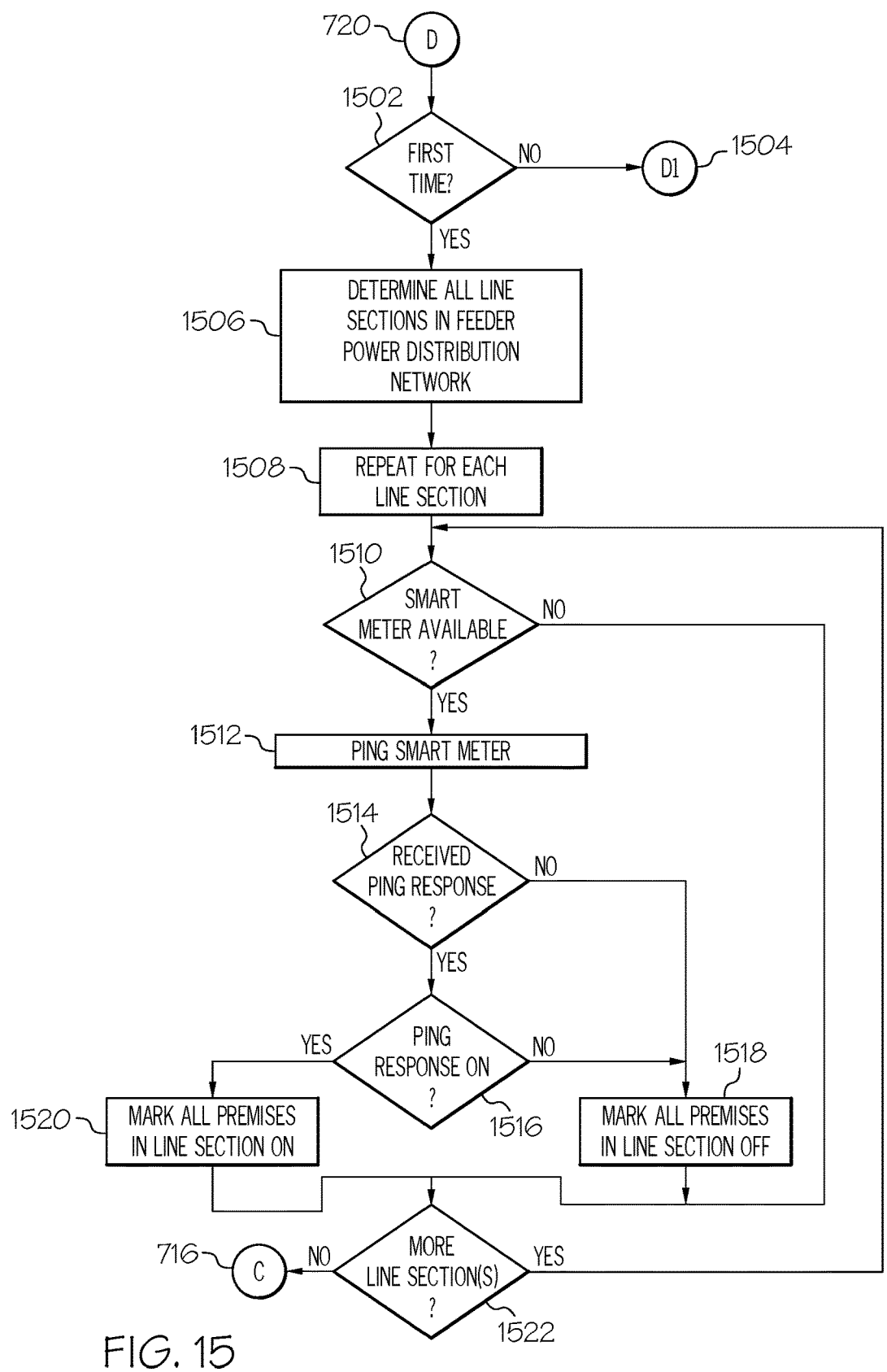

If the Type field 407 in the particular Ticket record 408, 410, 412, 414, 416, indicates that the Ticket is a Feeder type ticket, at step 712, then the process continues via the connector D 720 in FIG. 15. If the Ticket is not a Feeder type ticket, a Lateral type ticket, or a Transformer type ticket, at step 712, then the proactive outage alerts processing engine 103 exits the process, at step 718.

If the Ticket is a Lateral type ticket, at step 706, then the process, continuing in FIG. 8, checks the Status field 404 of the Ticket record 408, 410, 412, 414, 416, to determine whether this is the first time that this particular Ticket is being processed by the proactive outage alerts processing engine 103. That is, for example, if the Status field 404 of the Ticket record indicates that it is not a New Ticket, at step 802, then the process continues via the connector A1 803 in FIG. 11.

If the Status field 404 of the Ticket record 408, 410, 412, 414, 416, indicates that it is a New Ticket, at step 802, then the proactive outage alerts processing engine 103 determines, at step 804, how many single phases are in the lateral power line section. A single phase is normally one conductor that carries power signal at a single phase of alternating current. According to the present example, this information (i.e., how many single phases are in the lateral power line section) is found in a database maintained by the power outage management system 104. This information is regularly updated in the database (similar to updating a map, and related records, of the power distribution network) by the power outage management system 104 to track changes in topology of the power distribution network.

The proactive outage alerts processing engine 103 repeats for each single phase, starting at step 805, the following process. The proactive outage alerts processing engine 103 determines, at step 806, the total number of transformers in the single phase lateral power line section affected by the particular power outage condition covered by the New Ticket. According to the present example, this information (i.e., the total number of transformers in the lateral power line section) is found in the database maintained by the power outage management system 104. The following process is repeated, starting at step 807, for each of the transformers in the single phase lateral power line section.

The proactive outage alerts processing engine 103 determines, at step 808, any Last Gasp (LG) message and any Power Restore (PR) message selectively received from each Smart Meter 110, 112, 114, 116, on a transformer line 330, 332, 334 of a Transformer 318, 320, 322, affected by the particular power outage covered by the New Ticket.

For each of the affected transformers 318, 320, 322, the proactive outage alerts processing engine 103, at step 810, analyzes the LG message(s) and PR message(s) selectively received from the Smart Meters 110, 112, 114, 116, on the particular transformer line 330, 332, 334 of each affected Transformer 318, 320, 322. If it is determined, at step 810, that at least one LG message was selectively received (without also selectively receiving a more recent PR message) from the particular Smart Meters 110, 112, 114, on an affected transformer line 330 then the proactive outage alerts processing engine 103, at step 812, updates a history record in the outage notice history database 212 to indicate (to mark in the database record) that the particular affected transformer 318 and the associated transformer line 330 are OFF.

If both Last Gasp and Power Restore messages are selectively received from a particular Smart Meter 110, 112, 114, and are present against the customer premises 111, 113, 115, where the particular Smart Meter is located, the more recent message gains precedence. For example: suppose a Last Gasp message is selectively received time stamped having been sent at 15:00 from a Smart Meter at a customer premise and then a Power Restore message is selectively received time stamped having been sent at 15:01 from the Smart Meter at the customer premise. If the proactive outage alerts processing engine 103 looks at the history of messages selectively received from the Smart Meter at the customer location, at 15:03, then the Power Restore message (a more recent power restore message from the same smart meter) gains precedence over the earlier Last Gasp message, and this customer premise will be considered a power status being ON.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, based on the particular customer's profile record in the customer notification profile database 208.

The proactive outage alerts processing engine 103 then sends for each of those customers at least one request message to the customer notification server system 118. The sent request message is received and processed by the customer notification server system 118, which then generates from the information in the request message at least one power outage alerts notification message that is destined for reception by a specific communication device 130, 132, 134, associated with the customer who requested to be notified.

The customer notification server system 118 sends the at least one power outage alert message to the message communication infrastructure 120 and the customer communication network(s) 122, the power outage alerts message being destined for reception by a specific communication device 130, 132, 134, associated with the customer. For each of those customers that requested to be notified, the particular customer's communication device identification, and the customer's preferred communication channel to have communicated a power outage alerts message, is information maintained in a customer profile record stored in the customer notification profile database 208. In this way, all those customers that requested to be notified will be timely notified of a power outage condition that is specifically relevant to the customer's premises at the edge of the power distribution network 300.

Following the update of a history record in the outage notice history database 212 to indicate (to mark in the database record) that the particular affected transformer 318 and the associated transformer line 330 are OFF, at step 812, the process continues, at step 814. Similarly, if at least one LG message was not received, at step 810, the process continues, at step 814, in which is determined whether there are more transformers in the single phase lateral power line section affected by the power outage condition. If there are more transformers, at step 814, then the process repeats at steps 808, 810, 812, and 814, until all affected transformers have been checked for whether at least one LG message was received.

Thereafter, at step 816, the proactive outage alerts processing engine 103 determines whether there was no LG message received for any of the affected transformers 318, 320, 322. If no LG message was received, at step 816, then the process continues via connector A2 818 in FIG. 9. If at least one LG message was selectively received from a Smart Meter 110, 112, 114, 116, on a transformer line 330, 332, 334, associated with any of the affected transformers 318, 320, 322, then the process continues via the connector A3 820 in FIG. 10.

Figure 9:
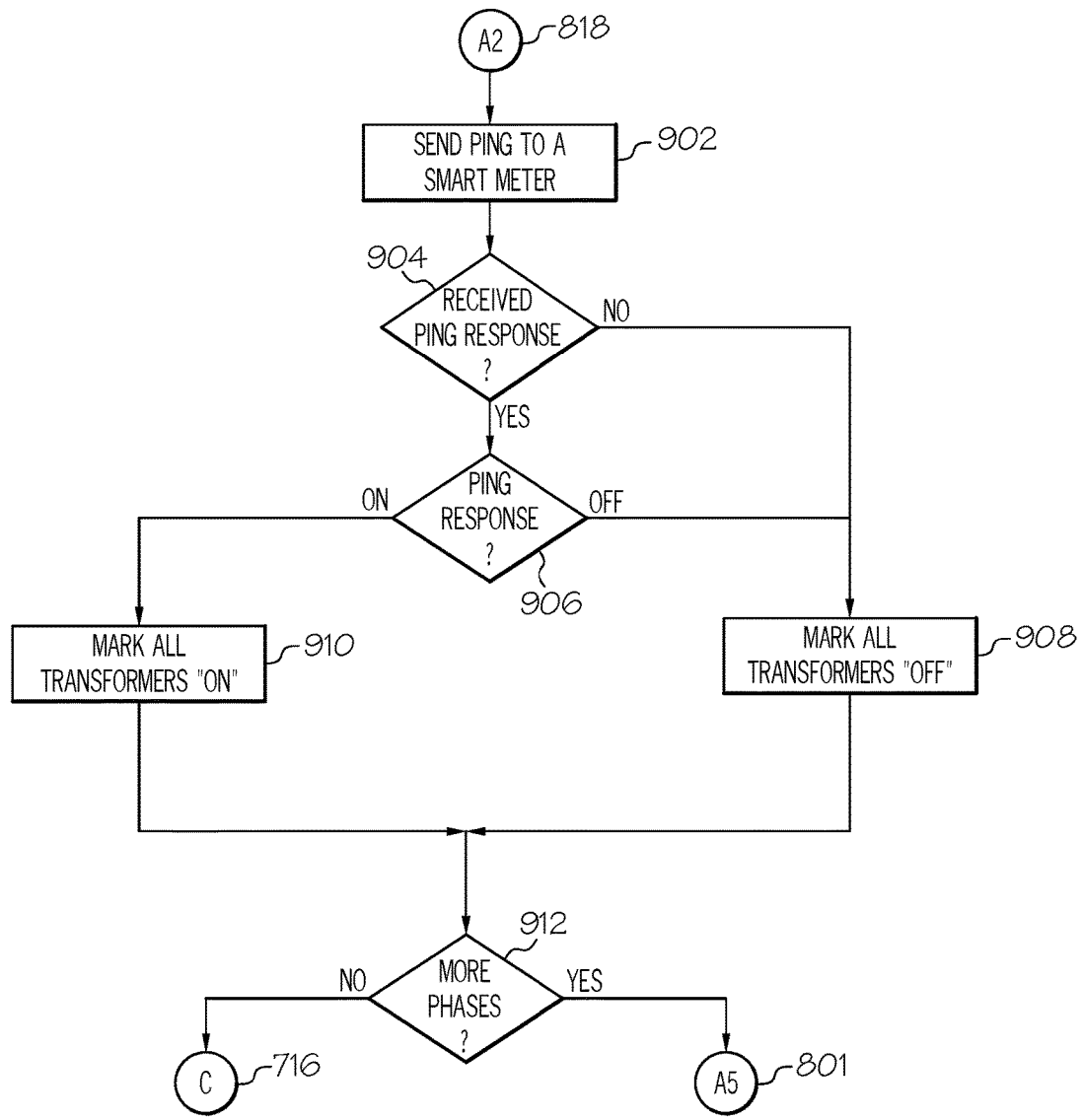

If no LG message was received, at step 816, then continuing in FIG. 9, the proactive outage alerts processing engine 103, at steps 902, 904, 906, selectively sends a ping message to a selected one of the Smart Meters 110, 112, 114, 116, on the transformer lines 330, 332, 334 of the affected transformers 318, 320, 322, and determines if a ping response message is selectively received, at step 904, from the selected one of the Smart Meters 110, 112, 114, 116. If no ping response message was selectively received from the selected one of the Smart Meters, at step 904, or if a ping response message is received, at step 906, indicating that an OFF condition is detected/measured at the selected one of the Smart Meters, then the proactive outage alerts processing engine 103, at step 908, updates a history record in the outage notice history database 212 to indicate (to mark in the database record) that all of the affected transformers 318, 320, 322, and the associated transformer lines 330, 332, 334, are OFF.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers 130, 132, 134, based on the particular customer's profile record in the customer notification profile database 208.

The proactive outage alerts processing engine 103 then sends for each of those customers at least one request message to the customer notification server system 118. The sent request message is received and processed by the customer notification server system 118, which then generates from the information in the request message at least one power outage alerts message that is destined for reception by a specific communication device 130, 132, 134, associated with the customer who requested to be notified.

The customer notification server system 118 sends the at least one power outage alerts message to the message communication infrastructure 120 and the customer communication network(s) 122, the power outage alerts message being destined for reception by a specific communication device associated with the customer. For each of those customers 130, 132, 134, that requested to be notified, the particular customer's communication device identification, and the customer's preferred communication channel to receive a power outage alerts message, is information maintained in a customer profile record stored in the customer notification profile database 208. In this way, all those customers that requested to be notified will be timely notified of a power outage condition that is specifically relevant to the customer's premises at the edge of the power distribution network 300.

Following the update of a history record in the outage notice history database 212 to indicate (to mark in the database record) that all of the affected transformers 318, 320, 322, and the associated transformer lines 330, 332, 334, are OFF, at step 908, the proactive outage alerts processing engine 103 determines if there are more single phases in the lateral power line section, at step 912. If there are more phases, at step 912, the process repeats for each phase by continuing at connector A5 801 in FIG. 8. If there are no more phases, at step 912, the process continues, at connector 716, in FIG. 7, to look-up in the Ticket database 400 a next Ticket to process, at step 704.

If it is determined that at least one ping response message was selectively received, at step 904, and that the ping response message indicates that the transformer line at the particular Smart Meter that sent the ping response has power ON, at step 906, then the proactive outage alerts processing engine 103, at step 910, updates a history record in the outage notice history database 212 to indicate (to mark in the database record) that all of the affected transformers 318, 320, 322, and the associated transformer lines 330, 332, 334, are ON.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends for each of those customers at least one power outage alerts message that is destined for reception by a specific communication device associated with the customer who requested to be notified. This process has already been discussed above and will not be repeated here for brevity.

Following the update of a history record in the outage notice history database 212 to indicate (to mark in the database record) that all of the affected transformers 318, 320, 322, and the associated transformer lines 330, 332, 334, are ON, at step 910, the proactive outage alerts processing engine 103 determines if there are more single phases in the lateral power line section, at step 912. If there are more phases, at step 912, the process repeats for each phase by continuing at connector A5 801 in FIG. 8. If there are no more phases, at step 912, the process continues, at connector 716, in FIG. 7, to look-up in the Ticket database 400 a next Ticket to process, at step 704.

Figure 10:
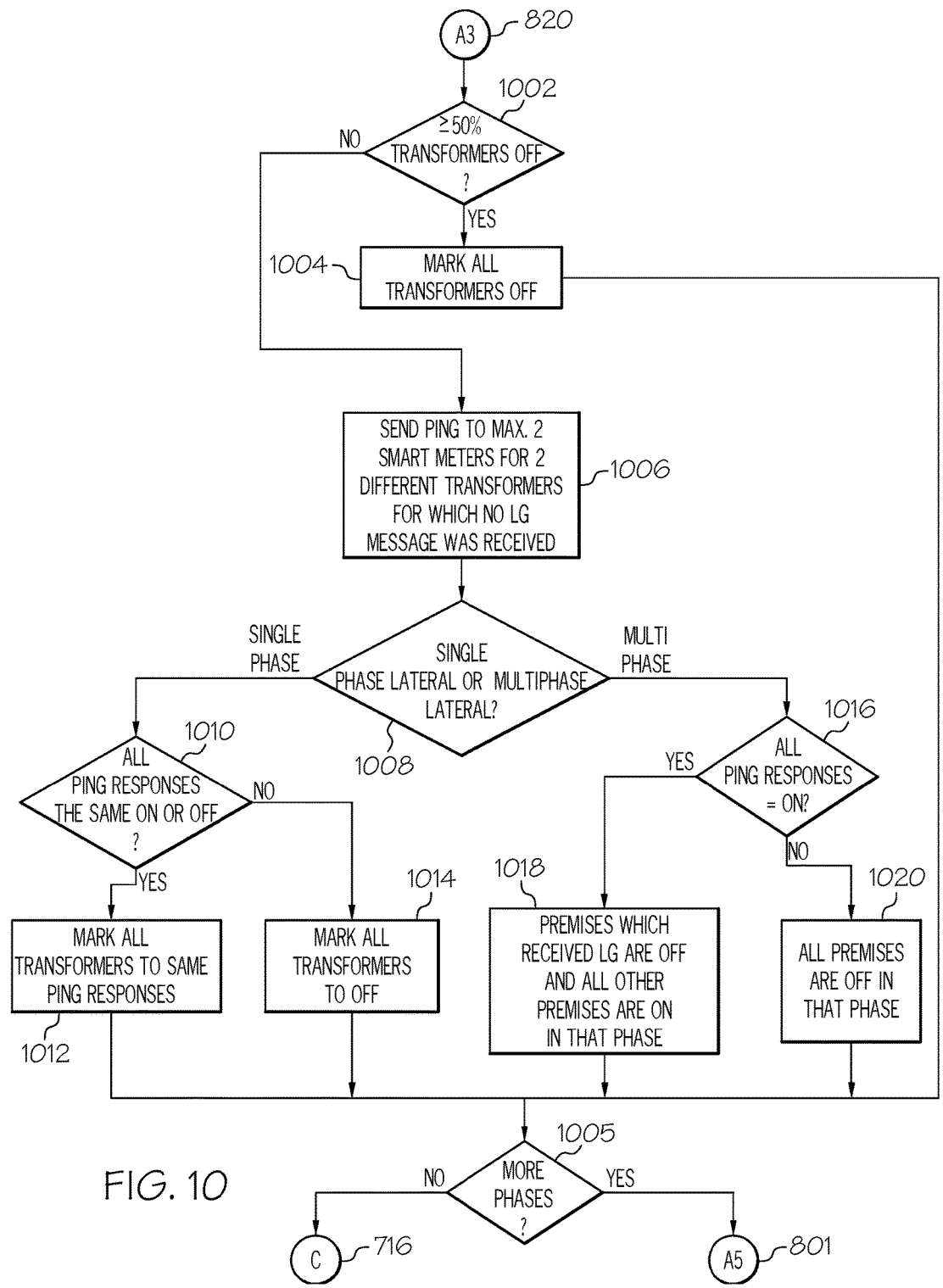

With reference again to FIG. 8, if it is determined, at step 816, that at least one LG message was received from a Smart Meter 110, 112, 114, 116, on a transformer line 330, 332, 334, associated with one of the affected transformers 318, 320, 322, then the process continuing in FIG. 10, determines, at step 1002, whether a defined percentage such as at least 50 percent or more of the affected transformers have been determined to be OFF. In such a case, at step 1004, the proactive outage alerts processing engine 103 updates a history record in the outage notice history database 212 to indicate (to mark in the database record) that all of the affected transformers 318, 320, 322, and the associated transformer lines 330, 332, 334, are OFF.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. This process has already been discussed above.

If, at step 1002, it is determined that a defined percentage such as less than 50 percent of the affected transformers are OFF, then the proactive outage alerts processing engine 103, at step 1006, selectively sends a ping message to each of a maximum of two Smart Meters 110, 112, 114, 116, on the transformer lines 330, 332, 334 associated with each transformer 318, 320, 322, for which no LG message was received.

The proactive outage alerts processing engine 103, at step 1008, determines how many phases are in the Lateral power line section 312, for each of the transformers 318, 320, 322, affected by the power outage condition indicated by the Ticket.

It should be noted that electrical powerlines can be a single phase power line, a dual phase power line, or a tri-phase powerline. Each of these phases of powerlines is sometimes identified by a letter "A", "B", or "C". The majority of customer premises are normally served electrical power using single phase powerlines. However, some customer premises require more electrical power such as to power large motors and other large power consuming equipment. These customer premises typically involve commercial customers.

In a tri-phase powerline section of the power distribution network 300 the tri-phase powerline can include an A phase powerline, a B phase powerline, and a C phase powerline. Customer locations that only need electrical power from a single phase powerline can be connected to any one of the A phase powerline, B phase powerline, and C phase powerline. If a power outage condition is experienced only in the B phase powerline, only those customer locations that are served electrical power by the B phase powerline will be affected by the power outage condition. Other customer locations that are being served electrical power by only the A phase powerline, by only the C phase powerline, or by only the A phase powerline and the C phase powerline, but not the B phase powerline, will continue to receive electrical power unaffected by the power outage condition in the B phase powerline.

If it is determined, at step 1008, that the powerline section is a single phase powerline then, at step 1010, if all ping response messages selectively received from the maximum two Smart Meters for each transformer indicate the same powerline status, i.e., all ping response messages indicate either power is ON or power is OFF, then the proactive outage alerts processing engine 103, at step 1012, updates a history record in the outage notice history database 212 to indicate (to mark in the database record) that all of the affected transformers 318, 320, 322, and the associated transformer lines 330, 332, 334, are the same powerline status—either ON or OFF.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. If there are more phases in the lateral power line section, at step 1005, then the process repeats for each phase by continuing at connector A5 801 in FIG. 8. If there are no more phases, at step 1005, the process continues, at connector 716, in FIG. 7, to look-up in the Ticket database 400 a next Ticket to process, at step 704.

If it is determined, at step 1010, that the two ping response messages selectively received from the two Smart Meters for each transformer indicate different powerline status, i.e., one ping response message indicates a power status—either ON or OFF—that is different from the power status indicated by the other ping response message, then the proactive outage alerts processing engine 103, at step 1014, updates a history record in the outage notice history database 212 to indicate (to mark in the database record) that all of the affected transformers 318, 320, 322, and the associated transformer lines 330, 332, 334, are OFF powerline status.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. The process then continues, at connector 716, to look-up in the Ticket database 400 a next Ticket to process, at step 704.

If it is determined, at step 1008, that the lateral powerline section is a multiphase powerline then, at step 1016, the proactive outage alerts processing engine 103 determines whether all ping response messages selectively received from the maximum two Smart Meters for each transformer indicate that power is ON. If all ping response messages indicate that power is ON, at step 1016, then the proactive outage alerts processing engine 103, at step 1018, updates a history record in the outage notice history database 212 to indicate (to mark in the database record) that for the particular phase in the power line any customer locations from which the proactive outage alerts processing engine 103 selectively received an LG message are marked with a power status OFF while all other customer locations served by the same phase power line are marked with a power status ON.

The proactive outage alerts processing engine 103, at step 1018, updates a history record in the outage notice history database 212 to indicate (to mark in the database record) that the customer locations from which was selectively received an LG message are power status OFF while all other customer locations served by the same phase power line are power status ON.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. If there are more phases in the lateral power line section, at step 1005, then the process repeats for each phase by continuing at connector A5 801 in FIG. 8. If there are no more phases, at step 1005, the process continues, at connector 716, in FIG. 7, to look-up in the Ticket database 400 a next Ticket to process, at step 704.

If it is determined, at step 1016, that not all ping response messages selectively received from the maximum two Smart Meters for each transformer indicate that power is ON, then the proactive outage alerts processing engine 103, at step 1020, updates a history record in the outage notice history database 212 to indicate (to mark in the database record) that for the particular phase in the power line all customer locations are power status OFF.

At this point, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. If there are more phases in the lateral power line section, at step 1005, then the process repeats for each phase by continuing at connector A5 801 in FIG. 8. If there are no more phases, at step 1005, the process continues, at connector 716, in FIG. 7, to look-up in the Ticket database 400 a next Ticket to process, at step 704.

Figure 11:
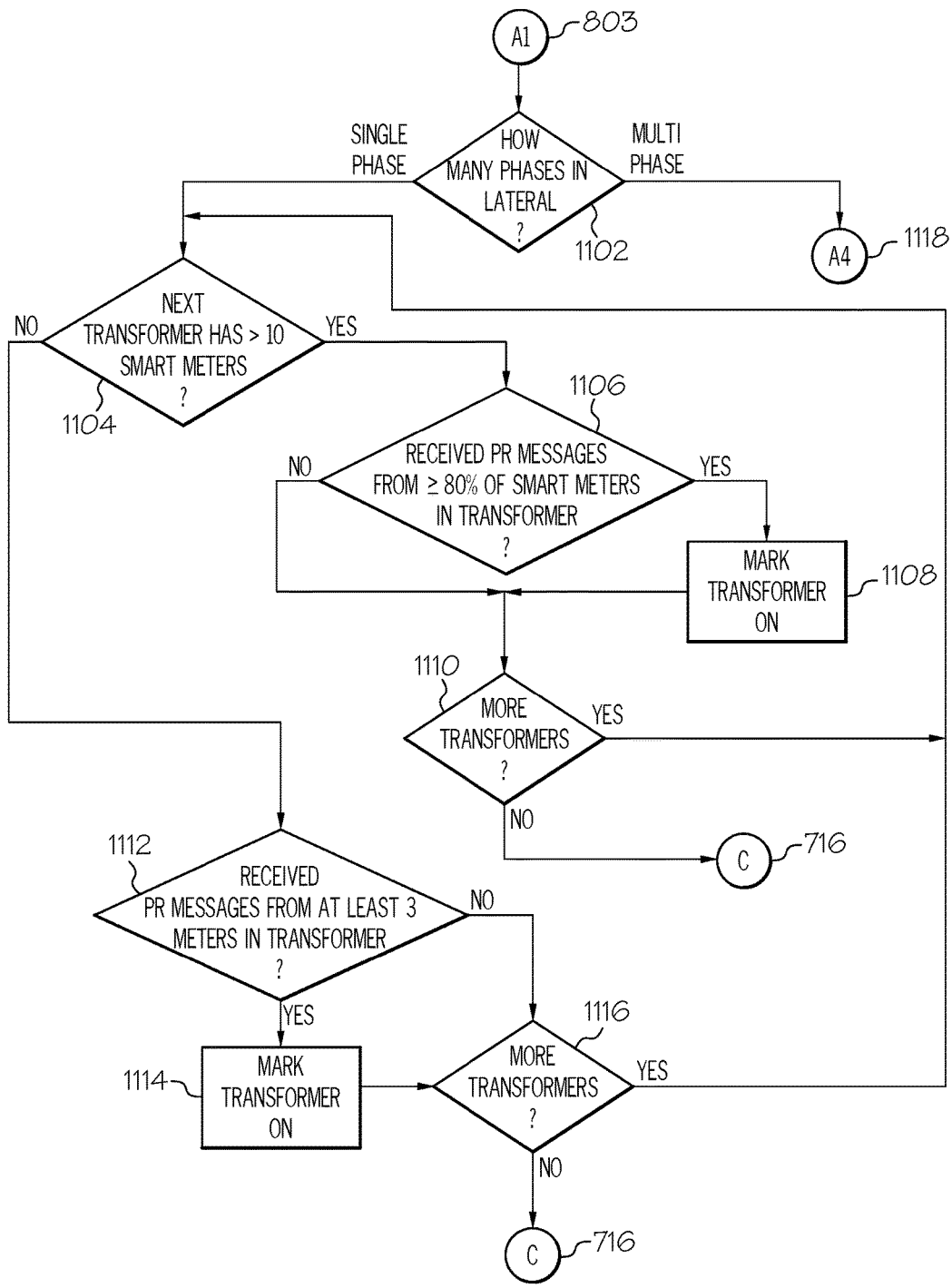

Referring back to FIG. 8, if the Status field 404 of the Ticket record indicates that this is not the first time that this particular Ticket is being processed by the proactive outage alerts processing engine 103, i.e., it is not a New Ticket, at step 802, then continuing in FIG. 11 the process, at step 1102, determines how many phases are in the Lateral power line section 312, for each of the transformers 318, 320, 322, affected by the power outage condition indicated by the Ticket.

If it is determined, at step 1102, that the powerline section is a single phase powerline then, at step 1104, the proactive outage alerts processing engine 103 checks for each transformer how many Smart Meters are connected to the same transformer line associated with the particular transformer.

If there are more than ten Smart Meters connected to the same transformer line, the proactive outage alerts processing engine 103 determines if it selectively received power restore (PR) messages from a defined percentage such as at least 80 percent or more of the Smart Meters. If it selectively received PR messages from a defined percentage such as at least 80 percent or more of the Smart Meters the proactive outage alerts processing engine 103 marks the transformer is power status ON.

If there are less than ten Smart Meters connected to the same transformer line, and the proactive outage alerts processing engine 103 selectively received PR messages from at least three of the Smart Meters, the proactive outage alerts processing engine 103 marks the transformer is power status ON.

At this point, in each of the two cases above, after marking the transformer is power status ON, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. Each of those customers will receive a power outage alerts message indicating that power has been restored to their customer location.

After all of the transformers have been checked for the number of Smart Meters connected to the transformer line associated with each of the transformers, at either step 1110 or step 1116, the process then continues, at step 716, to look-up in the Ticket database 400 a next Ticket to process, at step 704.

Figure 12:
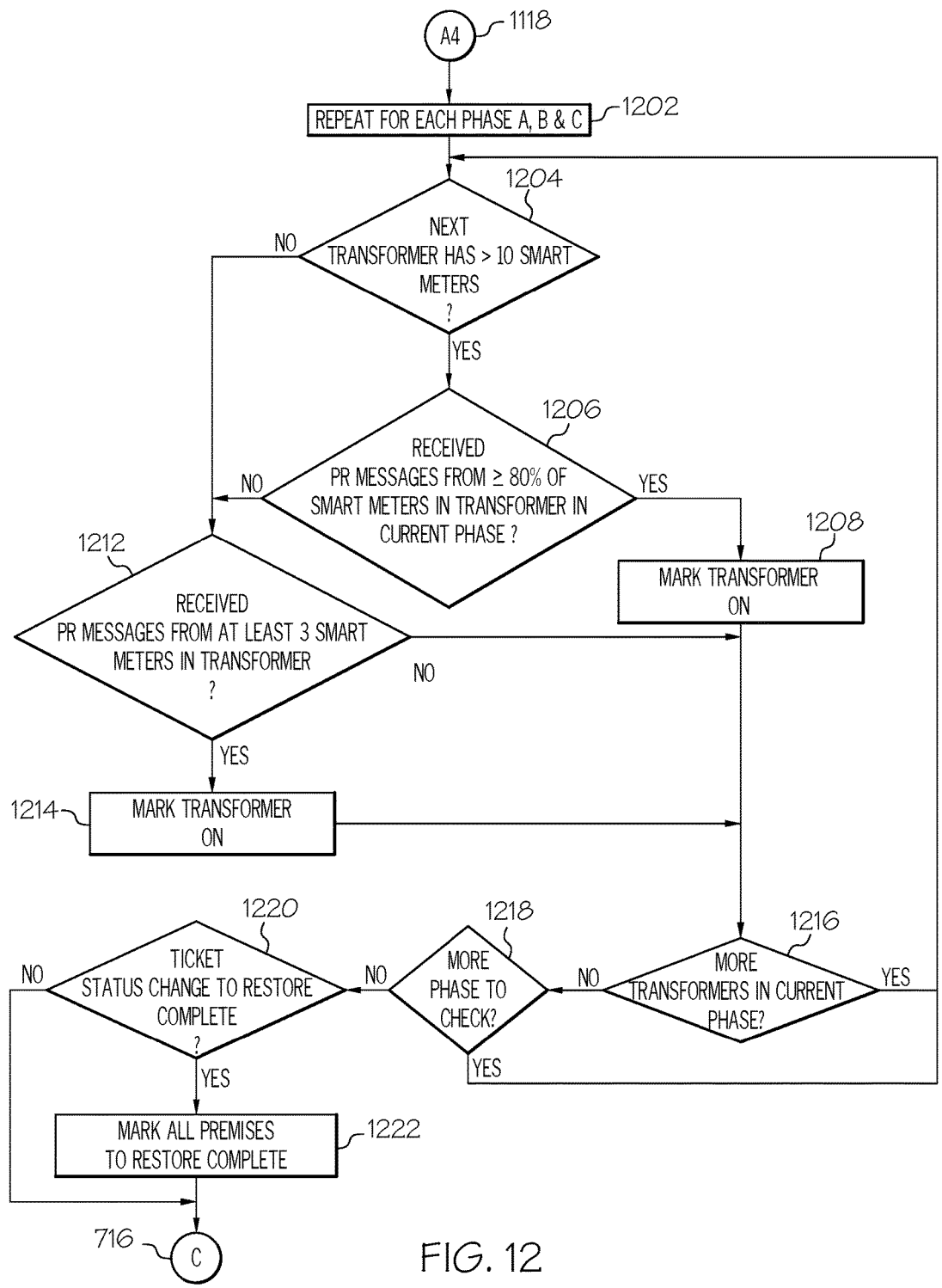

If it is determined, at step 1102, that the powerline section is a multiphase powerline then, the process continues via the connector A4 1118 in FIG. 12. The process repeats for each phase of the power line, at step 1202, by checking how many Smart Meters are connected to the same transformer line associated with each transformer in the same phase powerline.

If there are more than ten Smart Meters connected to the same transformer line, at step 1204, the proactive outage alerts processing engine 103 determines, at step 1206, if it selectively received power restore (PR) messages from at least 80 percent or more of the Smart Meters. If it selectively received PR messages from at least 80 percent or more of the Smart Meters the proactive outage alerts processing engine 103 marks the transformer is power status ON.

If there are less than ten Smart Meters connected to the same transformer line, at step 1204, and the proactive outage alerts processing engine 103 selectively received PR messages from at least three of the Smart Meters, at step 1212, the proactive outage alerts processing engine 103 marks, at step 1214, the transformer is power status ON.

At this point, in each of the two cases above for each phase of the powerline, after marking the transformer is power status ON, the proactive outage alerts processing engine 103 can also look-up in the customer notification profile database 208 whether any customers affected by the power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. Each of those customers will receive a power outage alerts message indicating that power has been restored to their customer location.

After all of the transformers have been checked for the number of Smart Meters connected to the transformer line associated with each of the transformers, at step 1216, the proactive outage alerts processing engine 103 determines if there are more single phases in the lateral power line section, at step 1216. If there are more phases, at step 1216, the process repeats for each phase by continuing at step 1204. If there are no more phases, at step 1216, then check Ticket status. If it is determined that the Ticket status changed to Restore, at step 1220, then the restoration of power to all of the customer locations (customer premises) on the same transformer line is complete. Accordingly, mark all customer locations with power status ON, at step 1222.

The proactive outage alerts processing engine 103 updates a history record in the outage notice history database 212 to indicate (to mark in the database record) that all of the Smart Meters 110, 112, 114, are power status ON.

At this point, the proactive outage alerts processing engine 103 can also look-up in the customer notification profile database 208 whether any customers affected by the change in status of power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. The process then continues, at connector 716, to look-up in the Ticket database 400 a next Ticket (e.g., look-up a repair service ticket in the ticket database) to process, at step 704.

If it is determined that the Ticket status has not changed to Restore, at step 1220, the process then continues, at step 716, to look-up in the Ticket database 400 a next Ticket (e.g., look-up a repair service ticket in the ticket database) to process, at step 704.

Process for a Transformer Ticket

Referring back to FIG. 7, if the Type field 407 in the particular Ticket record 408, 410, 412, 414, 416, indicates that the Ticket is a Transformer type ticket, at step 710, then the process, continuing in FIG. 13, checks the Status field 404 of the Ticket record 408, 410, 412, 414, 416, to determine whether this is the first time that this particular Ticket is being processed by the proactive outage alerts processing engine 103. That is, for example, if the Status field 404 of the Ticket record 408, 410, 412, 414, 416, indicates that it is not a New Ticket, at step 1302, then the process continues via the connector B1 1318 in FIG. 14.

If the Status field 404 of the Ticket record 408, 410, 412, 414, 416, indicates that it is a New Ticket, at step 1302, then the proactive outage alerts processing engine 103 determines, at step 1304, any Last Gasp (LG) message and any Power Restore (PR) message received from each Smart Meter 110, 112, 114, 116, on the transformer line 330, 332, 334 of the Transformer 318, 320, 322, affected by the particular power outage covered by the New Ticket.

All customer locations (customer premises) with Smart Meter 110, 112, 114, from which was selectively received an LG message, at step 1306, are marked with power status OFF. All customer locations with Smart Meter 110, 112, 114, from which was selectively received a PR message, at step 1306, are marked with power status ON.

If it is determined, at step 1308, that LG messages were selectively received from at least sixty percent or more of the Smart Meters 110, 112, 114, all customer locations in the same transformer line are marked with power status OFF. The proactive outage alerts processing engine 103, at step 1310, updates a history record in the outage notice history database 212 to indicate (to mark in the database record) that the particular Smart Meters 110, 112, 114, at respective customer locations on the same transformer line 330 are power status OFF.

At this point, the proactive outage alerts processing engine 103 can also look-up in the customer notification profile database 208 whether any customers affected by the change in status of power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified.

If it is determined, at step 1308, that LG messages were not received or were selectively received from less than sixty percent of the Smart Meters 110, 112, 114, then the proactive outage alerts processing engine 103, at step 1312, selectively sends a ping message to one of the Smart Meters 110, 112, 114, from which no LG message was received. This process may be repeated until a ping response message is selectively received from one of the Smart Meters 110, 112, 114, to which the ping message was sent.

If the selectively received ping response message indicates that the Smart Meter 110, 112, 114, to which the ping message was selectively sent, is experiencing a power status OFF, then, at step 1310, all the Smart Meters 110, 112, 114, at respective customer locations, are marked OFF. The proactive outage alerts processing engine 103 updates a history record in the outage notice history database 212 to indicate (to mark in the database record) that all of the Smart Meters 110, 112, 114, are power status OFF.

If, on the other hand, the selectively received ping response message indicates that the Smart Meter 110, 112, 114, to which the ping message was sent, is experiencing a power status ON, then, at step 1316, all the Smart Meters 110, 112, 114, at respective customer locations, are marked ON. The proactive outage alerts processing engine 103 updates a history record in the outage notice history database 212 to indicate (to mark in the database record) that all of the Smart Meters 110, 112, 114, are power status ON.

At this point, the proactive outage alerts processing engine 103 can also look-up in the customer notification profile database 208 whether any customers affected by the change in status of power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. The process then continues, at step 716, to look-up in the Ticket database 400 a next Ticket (look-up a repair service ticket in the ticket database) to process, at step 704.

Figure 14:
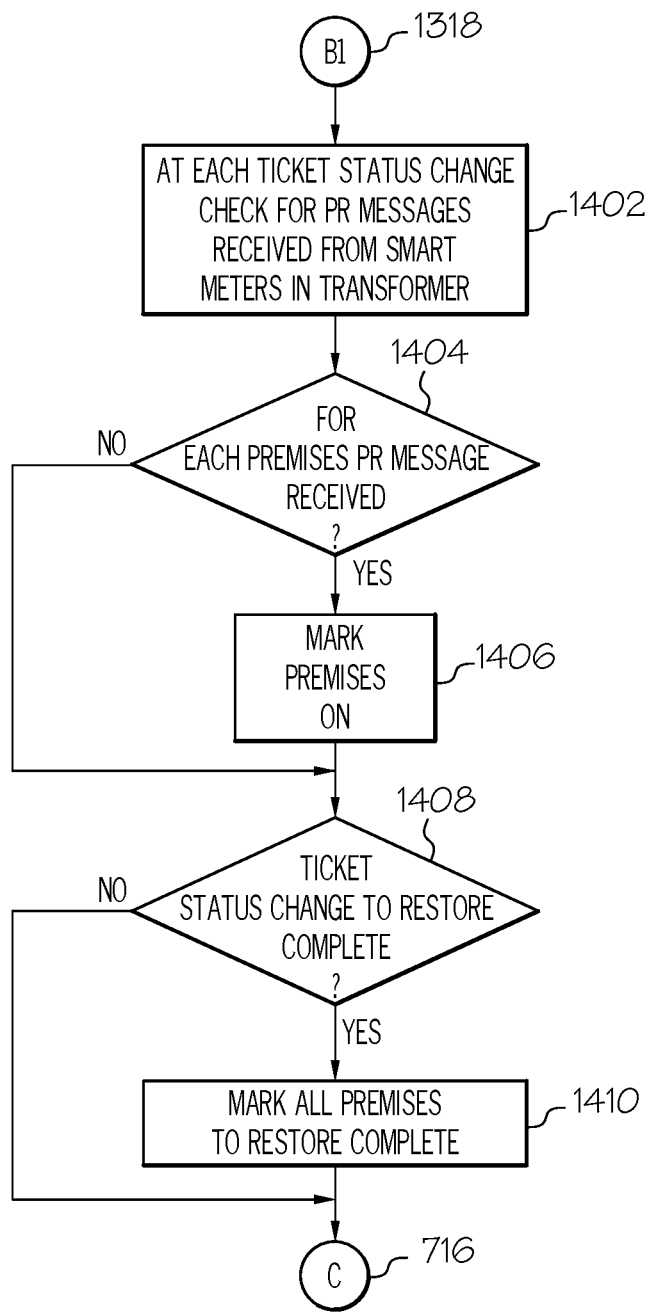

If the Status field 404 of the Ticket record, at step 1302, indicates that this is not the first time that this particular Ticket is being processed by the proactive outage alerts processing engine 103, i.e., it is not a New Ticket, then continuing in FIG. 14 the process, at step 1402, determines at each Ticket status change if any PR messages were received from the Smart Meters 110, 112, 114.

For each of the Smart Meters 110, 112, 114, and respective customer location, check if a PR message was selectively received, at step 1404. If a PR message was selectively received for any one of the customer locations, then mark all customer locations with power status ON. If it is determined that the Ticket status changed to Restore, at step 1408, then the restore of power to all of the customer locations on the same transformer line is complete. Accordingly, mark all customer locations with power status ON, at step 1410.

The proactive outage alerts processing engine 103 updates a history record in the outage notice history database 212 to indicate (to mark in the database record) that all of the Smart Meters 110, 112, 114, are power status ON.

At this point, the proactive outage alerts processing engine 103 can also look-up in the customer notification profile database 208 whether any customers affected by the change in status of power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. The process then continues, at step 716, to look-up in the Ticket database 400 a next Ticket (e.g., look-up a repair service ticket in the ticket database) to process, at step 704.

Process for a Feeder Ticket

Referring back to FIG. 7, if the Type field 407 in the particular Ticket record 408, 410, 412, 414, 416, indicates that the Ticket is a Feeder type ticket, at step 712, then the process, continuing at connector D 720 in FIG. 15, checks the Status field 404 of the Ticket record 408, 410, 412, 414, 416, to determine whether this is the first time that this particular Ticket is being processed by the proactive outage alerts processing engine 103. That is, for example, if the Status field 404 of the Ticket record 408, 410, 412, 414, 416, indicates that it is not a New Ticket, at step 1502, then the process continues via the connector D1 1504 in FIG. 16.

If the Status field 404 of the Ticket record 408, 410, 412, 414, 416, indicates that it is a New Ticket, at step 1502, then the proactive outage alerts processing engine 103 determines, at step 1506, all separate line sections in the particular feeder power distribution network. The process, starting at 1508, repeats for each separate line section. If a Smart Meter is not available in the particular line section, at step 1510, then check, at step 1522, if there are more line sections. If more line section(s), at step 1522, repeat for each line section by going to step 1510. If no more line sections, at step 1522, then the process continues, at connector 716, to look-up in the Ticket database 400 a next Ticket (e.g., look-up a repair service ticket in the ticket database) to process, at step 704.

If the proactive outage alerts processing engine 103 determines that a Smart Meter is available, at step 1510, then selectively send a ping message to the Smart Meter, at step 1512. If no ping response message is selectively received, at step 1514, or if a selectively received ping response message indicates that the Smart Meter 110, 112, 114, to which the ping message was selectively sent, is experiencing a power status OFF, then, at step 1518, all the Smart Meters 110, 112, 114, at respective customer premises, are marked OFF. The proactive outage alerts processing engine 103 updates a history record in the outage notice history database 212 to indicate (to mark in the database record) that all of the Smart Meters 110, 112, 114, are power status OFF.

If, on the other hand, the selectively received ping response message indicates that the Smart Meter 110, 112, 114, to which the ping message was sent, is experiencing a power status ON, then, at step 1520, all the Smart Meters 110, 112, 114, at respective customer locations, are marked ON. The proactive outage alerts processing engine 103 updates a history record in the outage notice history database 212 to indicate (to mark in the database record) that all of the Smart Meters 110, 112, 114, are power status ON.

At this point, the proactive outage alerts processing engine 103 can also look-up in the customer notification profile database 208 whether any customers affected by the change in status of power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified.

In one example implementation, if an outage signal, such as a ticket indicated that transformer grid element 318 was associated with an outage, then an over notification would be to send notification messages to all customer associated with smart meters line 330, including smart meters 110, 112, and 114. However, for any of several reasons, smart meter 112 may have power even though smart meters 110 and 114 may not. For example, the transformer phase associated with smart meter 112 may still be functional, or a field repair procedure coupled smart meter 112 to line 332, or smart meter 112 is miss-associated with transformer 318, or the premises associated with smart meter 112 is operating from an independent power source such as wind, solar and/or battery storage and is not drawing power from the grid. In order to mitigate over notification, a ping is sent to all smart meters associated with transformer 318, based upon the ticket, if no ping response message is received from a Smart Meter in acknowledgement of a ping message, then an outage notification message is sent to a customer communication device of a customer associated with the premises that are associated with the Smart Meter. If a ping response message is received from the Smart Meter in acknowledgement of a ping message, then the sending of the outage notification message is inhibited. The outage notification message, according to one example implementation, can comprise at least one of an email message, a text message, or a voice mail message. In certain embodiments, the selection of the outage notification message comprising at least one of an email message, a text message, or a voice mail message, is based on a configured value in a record stored in the customer notification profile database. In various embodiments, the configured value in the record stored in the customer notification profile database can be configured by the customer entering user input into a user interface. For example, a customer can access a web interface portal and by entering user input can select whether to receive outage notification messages comprising any of an email message, a text message, or a voice mail message, or a combination thereof.

If more line sections to process, at step 1522, then repeat for each line section by going to check if a Smart Meter is available, at step 1510. If no more line sections to process, at step 1522, then the process continues, at step 716, to look-up in the Ticket database 400 a next Ticket (look-up a repair service ticket in the ticket database) to process, at step 704.

Figure 16:
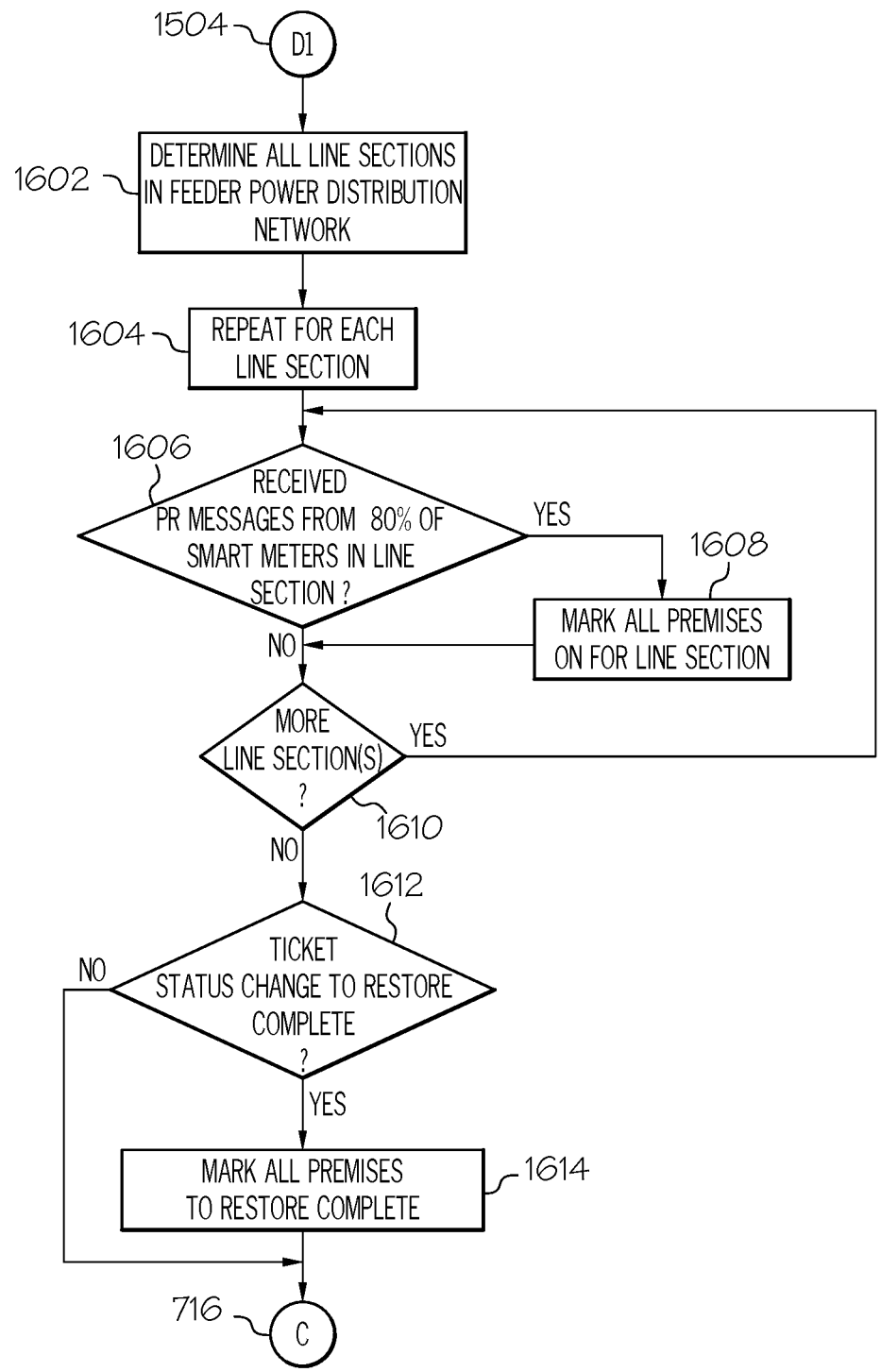

If the Status field 404 of the Ticket record, at step 1502, indicates that this is not the first time that this particular Ticket is being processed by the proactive outage alerts processing engine 103, i.e., it is not a New Ticket, then continuing in FIG. 16 the process, at step 1602, determines all line sections in the feeder power distribution network. The process, starting at 1604, repeats for each separate power line section. If it is determined, at step 1606, that there is at least one Smart Meter available in the particular power line section and the proactive outage alerts processing engine 103 received a PR message from at least 80 percent of Smart Meters in the power line section, then mark all premises ON for the power line section. If the proactive outage alerts processing engine 103 determines that it did not receive a PR message or received a PR message from less than 80 percent of Smart Meters in the power line section, at step 1606, then the proactive outage alerts processing engine 103 repeats the process 1604, 1606, 1608, 1610, for each power line section until no more power line sections remain to be processed for the Feeder power line.

If it is determined that there are no more power line sections to process, at step 1610, then check the Ticket status in the particular Ticket record. If it is determined that the Ticket status has changed to Restore, at step 1220, then the restoration of power to all of the customer locations on the same power line section is complete. Accordingly, mark all customer locations on the same power line section with power status ON, at step 1614.

The proactive outage alerts processing engine 103 updates a history record in the outage notice history database 212 to indicate (to mark in the database record) that all of the Smart Meters 110, 112, 114, are power status ON.

At this point, the proactive outage alerts processing engine 103 can also look-up in the customer notification profile database 208 whether any customers affected by the change in status of power outage condition also requested to be notified with power outage alerts messages. In such a case, the proactive outage alerts processing engine 103 generates a power outage alerts message for each of those customers, and then sends at least one power outage alerts message destined for reception by a specific communication device associated with each of those customers who requested to be notified. The process then continues, at connector 716, to look-up in the Tickets database 400 a next Ticket (e.g., look-up a repair service ticket in the ticket database) to process, at step 704.

If it is determined that the Ticket status has not changed to Restore, at step 1612, the process then continues, at step 716, to look-up in the Ticket database 400 a next Ticket (e.g., look-up a repair service ticket in the ticket database) to process, at step 704.

Example Information Processing System

The present subject matter can be realized in hardware or a combination of hardware and software. A system can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, which allow a computer to read such computer readable information.

Non-Limiting Examples

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method comprising:
   determining a potential outage associated with a portion of a multiplicity of customer premises coupled with an electrical power distribution grid based upon an outage signal associated with an element of the electrical power distribution grid, each of the multiplicity of customer premises having a smart meter coupling the customer premises to the electrical power distribution grid, the element of the electrical power distribution grid being upstream from a smart meter coupling the electrical power distribution grid to a customer premises of the portion of the multiplicity of customer premises;
   determining, based on the outage signal, the portion of the multiplicity of customer premises affected by the potential outage;
   initiating sending of a first initial signal to a first smart meter of a first customer premises of the portion of the multiplicity of customer premises, the first smart meter being downstream from the element of the electrical power distribution grid; and
   initiating sending of a first outage notification message to a first customer associated with the first customer premises, based upon a first response signal not being received from the first smart meter in acknowledgement of the first initial signal.

2. The method of claim 1, wherein the first initial signal comprises a first ping message, the first response signal comprises a first ping response message in acknowledgement of the first ping message, and the first outage notification message comprises at least one of an email message, a text message, or a voice mail message, sent to a customer device of the first customer.

3. The method according to claim 1, further comprising:
   initiating sending of a second initial signal to a second smart meter of a second customer premises of the portion of the multiplicity of customer premises, the second smart meter being downstream from the element of the electrical power distribution grid; and
   initiating sending of a second outage notification message to a second customer associated with the second customer premises, based upon the first response signal not being received from the first smart meter in acknowledgement of the first initial signal.

4. The method of claim 3, wherein the first initial signal comprises a first ping message, the first response signal comprises a first ping response message in acknowledgement of the first ping message, and the first outage notification message comprises at least one of an email message, a text message, or a voice mail message, sent to a customer device of the first customer; and
   wherein the second initial signal comprises a second ping message, the second response signal comprises a second ping response message in acknowledgement of the second ping message, and the second outage notification message comprises at least one of an email message, a text message, or a voice mail message, sent to a customer device of the second customer.

5. A proactive power outage alerts notification management system, comprising:
   a power outage management system for tracking electrical power outage conditions associated with elements of an electrical power distribution grid that are affecting a multiplicity of customer premises in the electrical power distribution grid, at least a first customer premises of the multiplicity of customer premises having a first smart meter coupling the first customer premises to the electrical power distribution grid and a second customer premises of the multiplicity of customer premises having a second smart meter coupling the second customer premises to the electrical power distribution grid, the first smart meter and the second smart meter being communicatively coupled with an advanced metering infrastructure to communicate electrical power outage conditions measured by the first smart meter at the first customer premises and/or measured by the second smart meter at the second customer premises, and communicated via the advanced metering infrastructure to a proactive outage alerts processing engine communicatively coupled with the advanced metering infrastructure;
a customer notification server system for sending outage notification messages to customers via a customer communication network, each customer being associated with a respective one of the multiplicity of customer premises, a first customer being associated with the first customer premises and a second customer being associated with the second customer premises;
the proactive outage alerts processing engine being operatively coupled with at least one processor, responsive to computer instructions stored in a memory, operating in a central outage alerts notification information processing system, the central outage alerts notification information processing system being communicatively coupled with the advanced metering infrastructure, the customer notification server system, and the power outage management system; and
the proactive outage alerts processing engine, in response to receiving an outage condition signal from the power outage management system, the outage condition signal being associated with an element of the electrical power distribution grid, performing the following:
determining, based upon the outage condition signal, a portion of the multiplicity of customer premises associated with a potential outage condition;
initiating, in response to the determining, sending of a first initial signal to the first smart meter of the first customer premises, the first smart meter being downstream from the element of the electrical power distribution grid; and
initiating sending of a first outage notification message to the second customer associated with the second customer premises, based upon a first response signal not being received from the first smart meter in acknowledgement of the first initial signal.

6. The proactive power outage alerts notification management system of claim 5, wherein:
the element of the electrical power distribution grid being upstream from a smart meter; and
the first initial signal comprises a first ping message, the first response signal comprises a first ping response message in acknowledgement of the first ping message, and the first outage notification message comprises at least one of an email message, a text message, or a voice mail message, sent to a customer device of the first customer.

7. The proactive power outage alerts notification management system of claim 5, wherein the proactive outage alerts processing engine, in response to receiving the outage condition signal from the power outage management system, performing the following:
initiating sending of a second initial signal to a second smart meter of a second customer premises of the portion of the multiplicity of customer premises, the first smart meter and the second smart meter being downstream from the element of the electrical power distribution grid; and
inhibiting sending of a second outage notification message to a second customer associated with the second customer premises, based upon a second response signal being received from the second smart meter in acknowledgement of the second initial signal.

8. The proactive power outage alerts notification management system of claim 7, wherein:
the element of the electrical power distribution grid being upstream from a smart meter, the element comprising at least one element selected from the following: a substation, a feeder line, a lateral line, a transformer, or switching equipment
the first initial signal comprises a first ping message, the first response signal comprises a first ping response message in acknowledgement of the first ping message, and the first outage notification message comprises at least one of an email message, a text message, or a voice mail message, sent to a customer device of the first customer; and
wherein the second initial signal comprises a second ping message, the second response signal comprises a second ping response message in acknowledgement of the second ping message, and the second outage notification message comprises at least one of an email message, a text message, or a voice mail message, sent to a customer device of the second customer.

9. The proactive power outage alerts management system of claim 5, comprising:
a plurality of smart meters, each smart meter in the plurality of smart meters being located at a respective one of a plurality of customer premises in the multiplicity of customer premises for monitoring electrical power delivered to the respective customer premises, and each smart meter in the plurality of smart meters being equipped for wireless communication of messages in a smart meter network communicatively coupled with the advanced metering infrastructure, the electrical power distribution grid including one or more electrical powerline sections, each smart meter in the plurality of smart meters being electrically coupled to a same power line section in the electrical power distribution grid, each customer premises in the plurality of customer premises being associated with a respective one customer in a plurality of customers of electrical power service provided with the electrical power distribution grid, at least one customer in the plurality of customers being respectively associated with at least one customer communication device equipped for communicating messages to the customer using one or more message communication channels, the messages being delivered to the customer communication device over one or more communication networks;
the power outage management system comprising a ticket database including database records for storing and updating information of repair service tickets associated with electrical power outage conditions affecting the one or more electrical powerline sections, each database record of a repair service ticket including a status of an electrical power outage condition and a repair service ticket type selected from one of a feeder power line, a lateral power line, or a transformer power line, which is experiencing the electrical power outage condition;
the customer notification server system for sending outage notification messages from the proactive outage alerts processing engine to customer communication devices associated with respective customers, the outage notification messages being destined for reception by the customer communication devices;

a customer notification profile database for storing records containing customer notification information, each particular record in the customer notification profile database including
  identification of a customer communication device associated with a customer requesting to be notified with outage notification messages, and
  identification of a communication channel for communicating outage notification messages to the customer via the customer communication device associated with the customer; and
the proactive outage alerts processing engine being configured to:
  look-up a database record in the ticket database;
  determine with information from the database record that was looked-up in the ticket database, an occurrence of a change in status of an electrical power outage condition affecting the one or more electrical powerline sections;
  selectively receive, over the smart meter network, at least one smart meter message from respective first at least one smart meter in the plurality of smart meters, the at least one smart meter message reporting a change in electrical power outage conditions detected by the first at least one smart meter and corresponding to the change in status of the electrical power outage condition indicated by the information from the database record that was looked-up in the ticket database;
  selectively transmit at least one ping message via the advanced metering infrastructure and the smart meter network destined for reception by second at least one smart meter in the plurality of smart meters, each ping message requesting a status of electrical power outage conditions at a smart meter that selectively received the ping message;
  selectively receive at least one ping response message from the second at least one smart meter in the plurality of smart meters, the at least one ping response message being a response to the at least one ping message, the at least one ping response message reporting electrical power outage conditions at the second at least one smart meter at a time the ping message was received by the second at least one smart meter;
  determine from the selectively received at least one ping response message, whether a defined percentage or more of the plurality of smart meters are all reporting the same electrical power outage conditions status;
  If the defined percentage or more of the plurality of smart meters are all reporting the same electrical power outage conditions status, then based on a customer notification information contained in particular records in the customer notification profile database, send a first outage notification message to each customer communication device associated with a customer requesting to be notified with power outage alerts messages and who is associated with a customer premises in the plurality of customer premises;
  If less than the defined percentage of the plurality of smart meters are reporting the same electrical power outage conditions status, then selectively transmit a maximum of two ping messages via the advanced metering infrastructure and the smart meter network destined for reception by respective maximum two of the second at least one smart meter in the plurality of smart meters and from which the proactive outage alerts processing engine has not received a smart meter message reporting a change in electrical power outage conditions status corresponding to the change in status of the electrical power outage condition indicated by the information from the database record looked-up in the ticket database; and
  based on at least one ping response message being selectively received from the maximum two of the second at least one smart meter in the plurality of smart meters, send a second outage notification message to each customer communication device associated with a customer requesting to be notified with outage notification messages and who is associated with a customer premises in the plurality of customer premises.

10. The system of claim 9, wherein the defined percentage of the plurality of smart meters is 50 percent.

11. The system of claim 9, in which the proactive outage alerts processing engine being configured to:
  determine based on the selectively received at least one smart meter message, whether a defined percentage or more of the plurality of smart meters are indicating the electrical power outage conditions status is OFF; and
  If the defined percentage or more of the plurality of smart meters are indicating the electrical power outage conditions status is OFF, then based on a customer notification information contained in particular records in the customer notification profile database, send the first outage notification message to each customer communication device associated with a customer requesting to be notified and who is associated with a customer premises in the plurality of customer premises, wherein the first outage notification message comprises an indication that the electrical power outage conditions status is OFF.

12. The system of claim 9, in which the proactive outage alerts processing engine being configured to:
  determine based on the selectively received at least one smart meter message, whether a defined percentage or more of the plurality of smart meters are reporting the electrical power outage conditions status is OFF; and
  If less than the defined percentage of the plurality of smart meters are indicating the electrical power outage conditions status is OFF, then selectively transmit a maximum of two ping messages via the advanced metering infrastructure and the smart meter network destined for reception by respective maximum two of the second at least one smart meter in the plurality of smart meters and from which the proactive outage alerts processing engine has not received a smart meter message comprising an indication of a last gasp message; and
  If the same power line section in the electrical power distribution grid is a single phase powerline, then
    If all ping response messages, in response to the selectively transmitted maximum of two ping messages, being selectively received from the maximum two of the second at least one smart meter in the plurality of smart meters are reporting the same electrical power outage conditions status, then based on a customer notification information contained in particular records in the customer notification profile database, send the second outage notification message to each customer communication device associated with a customer requesting to be notified with outage notification messages and who is associated with a customer premises in the plurality of customer premises, wherein the second power outage alerts message comprises an indication that the electrical power outage conditions status is the same electrical power outage conditions status being reported by all the ping response messages selectively received from the maximum two of the second at least one smart meter in the plurality of smart meters.

13. The system of claim 12, in which the proactive outage alerts processing engine being further configured to:
if the same power line section in the electrical power distribution grid is a single phase powerline, then
if all ping response messages being selectively received from the maximum two of the second at least one smart meter in the plurality of smart meters are not reporting the same power line status, then based on a customer notification information contained in particular records in the customer notification profile database, send the second outage notification message to each customer communication device associated with a customer requesting to be notified with outage notification messages and who is associated with a customer premises in the plurality of customer premises, wherein the second outage notification message comprises an indication that the electrical power outage conditions status is OFF.

14. The system of claim 9, in which the proactive outage alerts processing engine being further configured to:
if the same power line section in the electrical power distribution grid is a multiphase powerline, then
if all ping response messages being selectively received from the maximum two of the second at least one smart meter in the plurality of smart meters are reporting the electrical power outage conditions status is ON, then for each phase of the power line section:
based on a customer notification information contained in particular records in the customer notification profile database, send the second outage notification message to each customer communication device associated with a customer requesting to be notified with outage notification messages and who is associated with a customer premises in the plurality of customer premises, wherein
for customers who are associated with a customer premises and smart meter from which the proactive outage alerts processing engine has received a smart meter message comprising an indication of a last gasp message,
the second outage notification message comprises an indication that the electrical power outage conditions status is OFF; and
for all the other customers,
the second outage notification message comprises an indication that the electrical power outage conditions status is ON.

15. The system of claim 9, in which the proactive outage alerts processing engine being further configured to:
if the same power line section in the electrical power distribution grid is a multiphase powerline, then
if all ping response messages being selectively received from the maximum two of the second at least one smart meter in the plurality of smart meters are not reporting the electrical power outage conditions status is ON, then for each phase of the power line section:
based on a customer notification information contained in particular records in the customer notification profile database, send the second outage notification message to each customer communication device associated with a customer requesting to be notified with power outage alerts messages and who is associated with a customer premises in the plurality of customer premises, wherein the second outage notification message comprises an indication that an electrical power outage conditions status is OFF
for customers who are associated with a customer premises and smart meter from which the proactive outage alerts processing engine has received a smart meter message comprising an indication of a last gasp message,
the second outage notification message comprises an indication that the electrical power outage conditions status is OFF; and
for all the other customers,
the second outage notification message comprises an indication that the electrical power outage conditions status is ON.

16. A computer readable storage medium having computer readable program code embodied therewith, the computer readable program code comprising instructions executable by a processor in an outage alerts notification information processing system which, responsive to the instructions, the processor is configured to interoperate with a proactive outage alerts processing engine to perform the following operations:
determining a potential outage associated with a portion of a multiplicity of customer premises coupled with an electrical power distribution grid based upon an outage signal associated with an element of the electrical power distribution grid, each of the multiplicity of customer premises having a smart meter coupling the customer premises to the electrical power distribution grid, the element of the electrical power distribution grid being other than a smart meter;
determining, based on the outage signal, the portion of the multiplicity of customer premises affected by the potential outage;
initiating sending of a first initial signal to a first smart meter of a first customer premises of the portion of the multiplicity of customer premises; and
initiating sending of a first outage notification message to a first customer associated with the first customer premises, based upon a first response signal not being received from the first smart meter in acknowledgement of the first initial signal.

17. The computer readable storage medium of claim 16, wherein the first smart meter being downstream from the element of the electrical power distribution grid, and wherein the first initial signal comprises a first ping message, the first response signal comprises a first ping response message in acknowledgement of the first ping message, and the first outage notification message comprises at least one of an email message, a text message, or a voice mail message, sent to a customer device of the first customer.

18. The computer readable storage medium of claim 16, the processor being configured to interoperate with the proactive outage alerts processing engine to perform the following operations:

initiating sending of a second initial signal to a second smart meter of a second customer premises of the portion of the multiplicity of customer premises, the second smart meter being downstream from the element of the electrical power distribution grid; and initiating sending of a second outage notification message to a second customer associated with the second customer premises, based upon the first response signal not being received from the first smart meter in acknowledgement of the first initial signal.

19. The computer readable storage medium of claim 18, wherein the first initial signal comprises a first ping message, the first response signal comprises a first ping response message in acknowledgement of the first ping message, and the first outage notification message comprises at least one of an email message, a text message, or a voice mail message, sent to a customer device of the first customer; and wherein the second initial signal comprises a second ping message, the second response signal comprises a second ping response message in acknowledgement of the second ping message, and the second outage notification message comprises at least one of an email message, a text message, or a voice mail message, sent to a customer device of the second customer.

20. The method according to claim 1, wherein the element comprises at least one element of the electrical power distribution grid selected from the following: a substation, a feeder line, a lateral line, a transformer, or switching equipment.

* * * * *